United States Patent
Kozak

(10) Patent No.: US 9,904,286 B2
(45) Date of Patent: Feb. 27, 2018

(54) METHOD AND APPARATUS FOR PROVIDING ADAPTIVE TRANSITIONING BETWEEN OPERATIONAL MODES OF AN AUTONOMOUS VEHICLE

(71) Applicant: Nokia Technologies Oy, Espoo (FI)

(72) Inventor: Frank Kozak, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/882,081

(22) Filed: Oct. 13, 2015

(65) Prior Publication Data

US 2017/0102700 A1  Apr. 13, 2017

(51) Int. Cl.
| | |
|---|---|
| G05D 1/00 | (2006.01) |
| B60W 30/00 | (2006.01) |
| G01C 21/34 | (2006.01) |
| G01C 21/36 | (2006.01) |

(52) U.S. Cl.
CPC ............ *G05D 1/0061* (2013.01); *B60W 30/00* (2013.01); *G01C 21/3415* (2013.01); *G01C 21/3469* (2013.01); *G01C 21/3658* (2013.01); *G05D 2201/0213* (2013.01)

(58) Field of Classification Search
CPC . B60W 2040/0818; B60W 2040/0827; B60W 2040/0863; B60W 2040/0872; B60W 30/00; G05D 1/0061; G05D 1/021; G05D 1/0217; G05D 1/0223; G05D 1/0225; G05D 2201/0213; G01C 21/3415; G01C 21/3658
See application file for complete search history.

(56) References Cited

U.S. PATENT DOCUMENTS

| | | | |
|---|---|---|---|
| 8,818,608 B2 | 8/2014 | Cullinane et al. | |
| 8,874,301 B1 | 10/2014 | Rao et al. | |
| 8,909,476 B2 | 12/2014 | Tuukkanen | |
| 2014/0300479 A1 | 10/2014 | Wolter et al. | |
| 2014/0303827 A1* | 10/2014 | Dolgov | B60W 30/00 |
| | | | 701/23 |

(Continued)

FOREIGN PATENT DOCUMENTS

| | | | | |
|---|---|---|---|---|
| EP | 2979914 A2 * | 2/2016 | ............. | B60K 28/06 |
| WO | 2015071035 A1 | 5/2015 | | |

OTHER PUBLICATIONS

Knight, "Driverless Cars Are Further Away Than You Think", MIT Technology Review, Web Page, Oct. 22, 2013, 7 Pages.

(Continued)

*Primary Examiner* — Redhwan k Mawari
*Assistant Examiner* — Michael Whalen
(74) *Attorney, Agent, or Firm* — Ditthavong & Steiner, P.C.

(57) ABSTRACT

A method and apparatus for providing adaptive transitioning between operational modes of an autonomous vehicle. In one embodiment, the vehicle is a land-based passenger-carrying vehicle that travels on a road network and has an automatic mode in which one or more systems control travel of the vehicle on the road network. A system provides a modification of the operation of the vehicle to defer a transition time at which a transition occurs from the automatic mode to a manual mode to extend a period of time during which the vehicle is operated in the automatic mode beyond an earlier possible time at which the transition could occur.

14 Claims, 16 Drawing Sheets

(56) References Cited

U.S. PATENT DOCUMENTS

| | | |
|---|---|---|
| 2015/0006005 A1 | 1/2015 | Yu et al. |
| 2015/0094896 A1 | 4/2015 | Cuddihy et al. |
| 2015/0094899 A1 | 4/2015 | Hackenberg et al. |
| 2015/0105960 A1 | 4/2015 | Pilutti et al. |
| 2015/0149017 A1 | 5/2015 | Attard et al. |
| 2016/0378114 A1* | 12/2016 | Laur .................... G05D 1/0061 701/23 |

OTHER PUBLICATIONS

SFO, "Cell Phone Waiting Lot", Web Page, Aug. 28, 2013, retrieved on Sep. 21, 2015 from http://www.flysfo.com/to-from/parking/cell-phone-waiting-lot, 1 Page.

ALK, "Professional-quality map data that drives an industry", ALK Maps, Web Page, 2015, retrieved on Oct. 13, 2015, 2015 from http://www.alkmaps.com/data.aspx, 2 Pages.

* cited by examiner

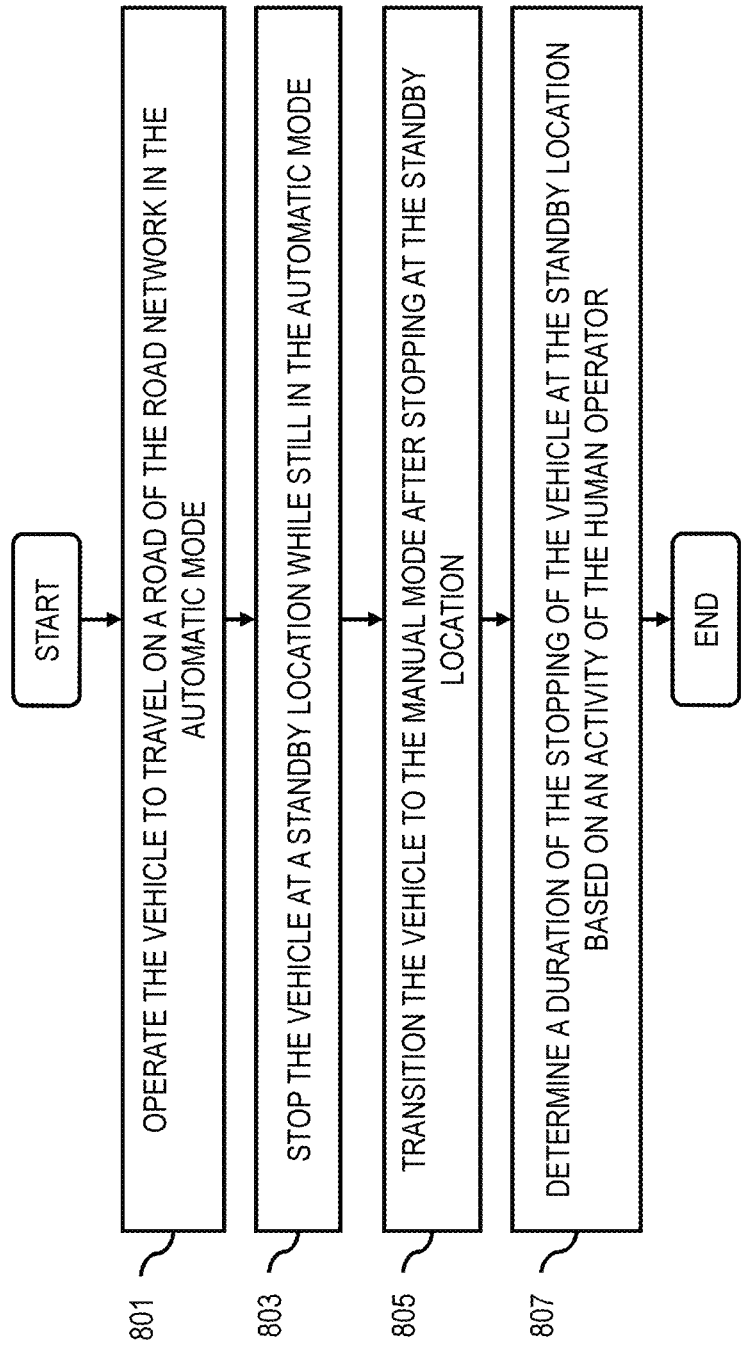

METHOD AND APPARATUS FOR PROVIDING ADAPTIVE TRANSITIONING BETWEEN OPERATIONAL MODES OF AN AUTONOMOUS VEHICLE

BACKGROUND

Service providers and manufacturers are continually challenged to deliver value and convenience to consumers by, for example, providing autonomous or semi-autonomous (ASA) operating vehicles and related services and functions. One significant consumer benefit of autonomous vehicles is that autonomous vehicles enable users to engage in activities (e.g., reading, watching a movie, playing a video game, etc.) other than driving while the vehicle is operated in the autonomous mode. However, in some situations, the vehicle may need to transition to a non-autonomous mode where the driver's input or control is needed, which may potentially interrupt the driver when the driver is engaged in non-driving activity, thereby providing a poor user experience.

SOME EXAMPLE EMBODIMENTS

Therefore, there is a need for an approach to determine a transition point/time for changing the operating mode of a vehicle (e.g., from automatic mode to manual mode or vice versa) and initiating a deferral of the transition.

According to one embodiment, a method of operation for a land-based passenger-carrying vehicle that travels on a road network, wherein the vehicle has an automatic mode in which one or more systems control travel of the vehicle on the road network and a manual mode in which real-time input from a human operator controls travel on the road network, comprises providing a modification of the operation of the vehicle to defer a transition time at which a transition occurs from the automatic mode to the manual mode to extend a period of time during which the vehicle is operated in the automatic mode beyond an earlier possible time at which the transition could occur.

According to another embodiment, an apparatus comprises at least one processor, and at least one memory including computer program code for one or more computer programs, the at least one memory and the computer program code configured to, with the at least one processor, cause, at least in part, the apparatus to provide a modification of the operation of the vehicle to defer a transition time at which a transition occurs from the automatic mode to the manual mode to extend a period of time during which the vehicle is operated in the automatic mode beyond an earlier possible time at which the transition could occur.

According to another embodiment, a computer-readable storage medium carries one or more sequences of one or more instructions which, when executed by one or more processors, cause, at least in part, an apparatus to provide a modification of the operation of the vehicle to defer a transition time at which a transition occurs from the automatic mode to the manual mode to extend a period of time during which the vehicle is operated in the automatic mode beyond an earlier possible time at which the transition could occur.

According to another embodiment, an apparatus comprises means for providing a modification of the operation of the vehicle to defer a transition time at which a transition occurs from the automatic mode to the manual mode to extend a period of time during which the vehicle is operated in the automatic mode beyond an earlier possible time at which the transition could occur.

According to one embodiment, a method of operation for a land-based passenger-carrying vehicle that travels on a road network, wherein the vehicle has an automatic mode in which one or more systems control travel of the vehicle on the road network and a manual mode in which real-time input from a human operator controls travel on the road network, the method comprises traveling on a road of the road network in the automatic mode. The method also comprises stopping the vehicle at a standby location while still in the automatic mode. The method further comprises after stopping at the standby location, transition the vehicle to the manual mode.

In addition, for various example embodiments of one or more proposed methods, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the proposed methods.

For various example embodiments of the proposed methods, the following is also applicable: a method comprising facilitating access to at least one interface configured to allow access to at least one service, the at least one service configured to perform any one or any combination of network or service provider methods (or processes) disclosed in this application.

For various example embodiments of the proposed methods, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the proposed methods, and/or at least one signal resulting from one or any combination of methods (or processes) disclosed in this application as relevant to any embodiment of the proposed methods.

For various example embodiments of the proposed methods, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the proposed methods, and/or at least one signal resulting from one or any combination of methods (or processes) disclosed in this application as relevant to any embodiment of the proposed methods.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the proposed methods are readily apparent from the following detailed description, simply by illustrating a number of particular embodiments and implementations, including the best mode contemplated for carrying out the proposed methods. The proposed methods is also capable of other and different embodiments, and its several details can be modified in various obvious respects, all without departing from the spirit and scope of the proposed methods. Accordingly, the drawings and description are to be regarded as illustrative in nature, and not as restrictive.

BRIEF DESCRIPTION OF THE DRAWINGS

The embodiments of the proposed methods are illustrated by way of example, and not by way of limitation, in the figures of the accompanying drawings:

FIGS. 4 through 8 illustrate flowcharts of various processes for determining a transition point/time for an operating mode of a vehicle and initiating a deferral of a transition, according to various embodiments;

DESCRIPTION OF SOME EMBODIMENTS

Examples of a method, apparatus, and computer program for providing adaptive transitioning between operational modes of an autonomous vehicle are disclosed. In the following description, for the purposes of explanation, numerous specific details are set forth in order to provide a thorough understanding of the embodiments of the proposed methods. It is apparent, however, to one skilled in the art that the embodiments of the proposed methods may be practiced without these specific details or with an equivalent arrangement. In other instances, well-known structures and devices are shown in block diagram form in order to avoid unnecessarily obscuring the embodiments of the proposed methods. Although various embodiments are described with respect to determining a transition point/time and initiating a deferral of an upcoming transition of an operating mode (e.g., autonomous to manual) of an autonomous or semi-autonomous (ASA) vehicle, it is contemplated that the approach described herein may be applicable to any methods that can be modelled according to example processes described below.

Figure 1:
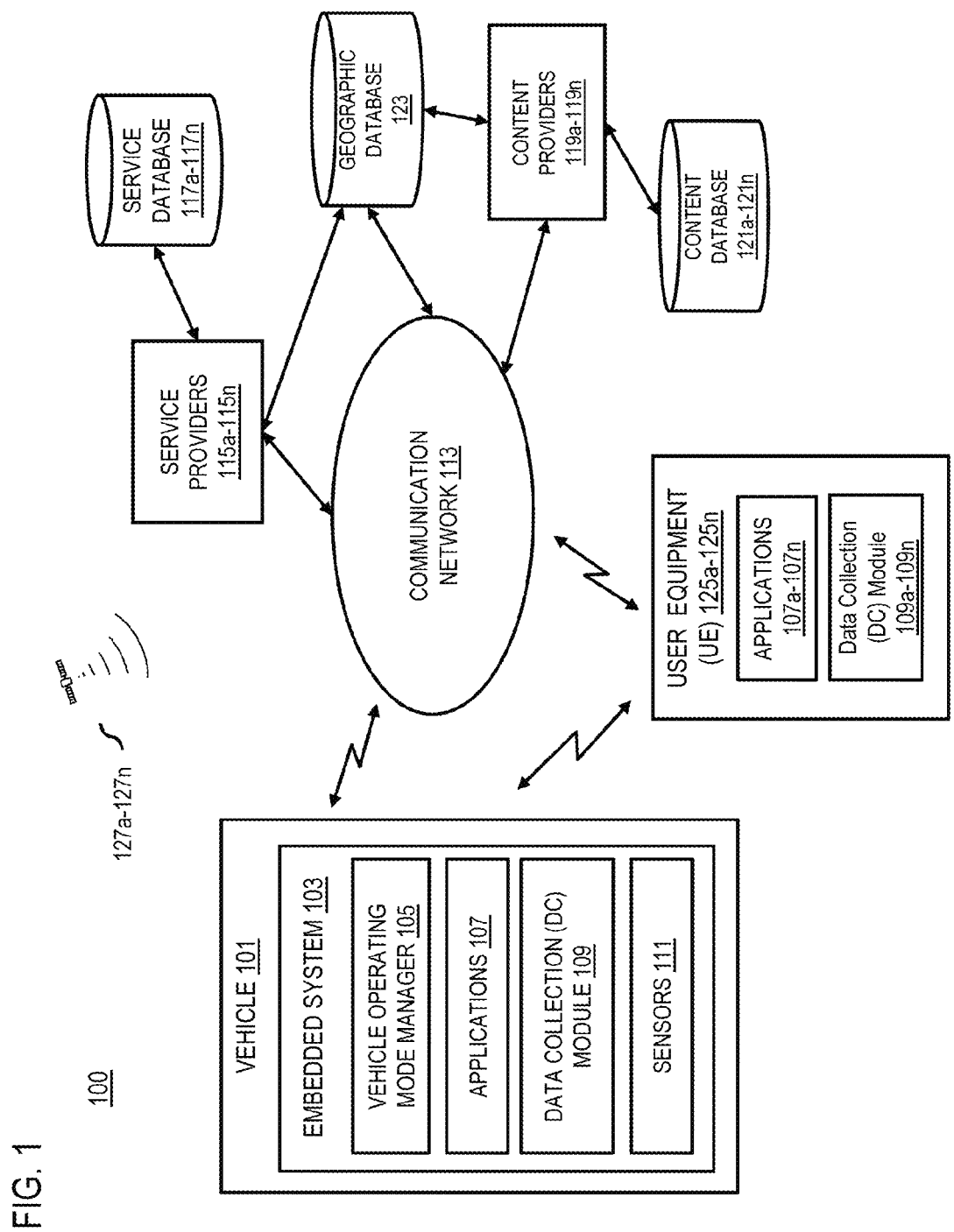
FIG. 1 is a diagram of a system capable of determining a transition point/time for an operating mode of a vehicle and initiating a deferral of a transition, according to an embodiment.

FIG. 1 is a diagram of a system for determining a transition point/time for an operating mode of a vehicle and initiating a deferral of a transition, according to one embodiment. As previously discussed, one key benefit of ASA vehicles is that when operated in autonomous or automatic mode, users are able to safely engage in non-driving activities while vehicle systems control travel functions. For example, the systems of a vehicle operating in an autonomous/automatic mode may require little to no input from a user/operator of the vehicle while traveling along a travel route. In many cases, after receiving/determining a destination point (e.g., user input at a navigation system in the vehicle), control systems of an autonomous vehicle may determine a travel route to autonomously operate the vehicle to the destination. As part of this process, the autonomous vehicle, for instance, utilizes information about the travel route (e.g., travel segment type, designated operational modes for a particular segment—such as automatic or manual modes, speed limits, etc.) as well as sensed information about the surrounding environment (e.g., traffic conditions, weather, etc.) to autonomously operate the vehicle.

However, even when operated in automatic or autonomous mode, an ASA vehicle may at certain points of a travel route require a different mode of operation (e.g., a semi-autonomous mode or a manual mode of operation). For example, if the route passes through (1) sections of a road network designated (e.g., by regulatory authorities) as requiring manual mode operation, (2) areas where mapping data are not detailed enough to support the automatic mode, or (3) complex areas such as constructions zones or city centers, etc. In one embodiment, in a semi-autonomous mode, vehicle control systems are capable of controlling safety/critical functions of the vehicle along certain travel routes, and under certain traffic and environmental conditions while the driver remains in manual control of some driving functions (e.g., radar-assisted cruise-control where systems control acceleration and braking while the driver controls steering). In manual mode, the driver is responsible for real-time manual control of the vehicle while traveling along a travel route. However, because the driver or other passengers of ASA may have already been engaged in non-driving related activities, transitioning from autonomous to non-autonomous mode (e.g., manual mode or semi-autonomous mode) can potentially disrupt those activities.

To address this problem, a system 100 introduces capabilities for estimating when a transition from automatic mode to manual mode (or vice versa) is expected to occur when traveling in an autonomous vehicle and then initiating a deferral of the transition. In one embodiment, the system 100 can modify the operation of the vehicle to implement to deferral so that the time or location at which the mode transition is to occur can be extended to a later time. In one embodiment, the system 100 can initiate the modifications (e.g., through autonomous vehicle systems) by initiating actions including, but not limited to: (1) slowing down the travel speed of the vehicle; (2) traveling on an alternative route—e.g., a longer route or route that takes more travel time; (3) changing to a slower lane or a road on which the vehicle travels; and/or (4) stopping the vehicle temporarily at a standby location. In one embodiment, the modifications are performed automatically by vehicle systems in automatic mode.

In one embodiment, the system 100 can determine which type of modification to perform or which standby location to use (e.g., if the option to stop the vehicle at a standby location is selected) based on a desired deferral time. By way of example, the desired deferral time can be entered by a user, determined based on a non-driving activity in which the user is currently engaged, or a combination thereof. In one embodiment, the non-driving activity can be specified by the user and/or determined from data available to the system 100 (e.g., sensor data, calendar data, contextual data, etc.).

In one embodiment, the system 100 identifies the standby location in a map database (e.g., a geographic database 123).

For example, the standby location can be identified using one or more criteria. In one embodiment, the criteria may specify locations where the vehicle can stop for a duration of time, stop for a duration of time while in automatic mode (e.g., accessible along roads on which the vehicle can operate in automatic mode), stop for a duration of time while one or more passengers remain in the vehicle, etc. In addition or alternatively, the standby location can be selected to minimize or decrease energy usage or emissions (e.g., carbon emissions) from the vehicle.

In one embodiment, the criteria may specify standby locations that have room for the vehicle. For example, the system 100 can determine availability of parking spaces or spaces of sufficient size to accommodate the vehicle for a desired period of time at one or more candidate standby locations. In one embodiment, the system 100 can coordinate the use of standby locations with other vehicles (e.g., connected autonomous vehicles). This coordination can include, for instance, autonomously moving cars from one location or space to another to accommodate a vehicle at a particular standby location.

As previously noted, ASA vehicles may include advanced technologies or systems to autonomously control and guide the vehicle from a point of origin to a destination point, for example, by use of Global Navigation Satellite System (GNSS), e.g., a Global Positioning System (GPS), or similar systems for determining map/geographic location information. However, at one or more transition points/areas (e.g., construction zones, regulated areas, etc.) between the origin and destination points, an ASA vehicle may be required to change its operating mode to a non-autonomous mode. For instance, the ASA vehicle may require driver interaction when within a busy section of a city (e.g., city center).

As noted, in some instances, the driver/occupants (also referred to as a user or users) of an ASA vehicle may request or wish to defer a mode transition of the vehicle (e.g., to a non-autonomous mode) so that the driver or occupants of the vehicle may complete a task or activity in the vehicle. In various scenarios, the system 100 may determine one or more options for delaying/deferring an upcoming mode transition and present the options and related information to the occupant(s). In one example, the system 100 may collect and analyze information (e.g., user input at a navigation system, a user device, user travel itinerary, user calendar, etc.) for travelling from a point of origin to a destination point, and determine if there are any transition points that may require/suggest a certain mode of operation for vehicles travelling through those transition points. Next, the system 100 may determine from user information whether the user may be engaged in one or more user activities (e.g., content consumption, conference calls, etc.) en route to the destination point. In one use case scenario, the system 100 may determine an estimated time of travel to reach a transition point along a selected travel route and an estimated time for completion of the one or more user activities. Based on the information, if the user activities may be incomplete prior to arriving at the transition point, the system 100 may determine and present various options and related information to the user via one or more devices in the vehicle, a user device, etc. The presented options may include taking a longer route to delay arriving at a transition point, taking a different route (e.g., a toll road, a private road, etc.) to avoid a transition point, taking a road dedicated to autonomous vehicles, scheduling a stop at a point of interest (POI) before arriving at the transition point, driving at a slower speed during some of the travel time, or the like options. Based on an estimated deferral time that may be required, the system 100 may recommend an option or place a best option on top of a list of options presented to the user.

In another use case scenario, while the ASA vehicle is en route to the destination point, the system 100 and/or the user may determine that a deferral of an upcoming transition may be suggested/required so that the user can complete a user activity, which the user may have engaged in after leaving the point of origin. In another example, at the point of origin point, a user may have started an activity that the system 100 and/or the user had estimated that it would be completed before arriving at the transition point; however, based on a current estimate, the user may be unable to complete the activity. At that point, the system 100 may determine an estimated time (e.g., duration of a deferral of an upcoming transition) for completion of the user activity and present one or more options to the user. Upon receiving a selection from the driver, the system 100 may validate the selection and initiate one or more possible actions related to the operating mode of the vehicle.

In another use case scenario, based on the user activity, if the system 100 determines that a deferral of an upcoming mode transition is necessary, then the system 100 may initiate one or more actions to modify an operation of the vehicle for deferring the upcoming mode transition.

In one embodiment, a land-based passenger-carrying vehicle that travels on a road network may operate in an automatic mode wherein one or more systems may control travel of the vehicle on the road network. The vehicle may also operate in a manual mode in which real-time input from a human operator may control travel on the road network. In one embodiment, the system 100 may determine routing information for a vehicle to operate in an autonomous mode for traveling to a destination point of a user. In various scenarios, one or more devices (e.g., a navigation system) in the vehicle or a user device (e.g., a mobile device) may collect and analyze information (e.g., from user input, travel itinerary, calendar, etc.) for travelling from a point of origin to a destination point. One or more elements of the system 100 may determine one or more travel routes to the destination point. A driver/user of the vehicle and/or an element of the system 100 may select one of the routes (e.g., based on user history, user preferences, route condition/type/class, etc.) for travelling to the destination point.

In one embodiment, the system 100 may process and/or facilitate a processing of information about a selected travel route to determine a transition time and/or a transition point for at least one transition of the operating mode of the vehicle between autonomous, semi-autonomous, and non-autonomous modes. In various scenarios, the system 100 may utilize one or more sources to determine information about the selected route, wherein the information may include details about the route class/type, any transition points (e.g., autonomous to non-autonomous) before arriving at the destination point, any restrictions related to a configuration of a vehicle using the route (e.g., non-autonomous only, autonomous only, mixed use, etc.), or the like information. In one scenario, the same information may be determined for the non-selected travel routes for comparison and possible recommendation to the driver/occupant(s). In one embodiment, the system 100 may utilize one or more applications, algorithms, or service providers to determine a transition time or a distance to the transition point where the operating mode of the vehicle may be required to transition, for example, to a semi-autonomous or non-autonomous mode. The transition time or distance to the transition point may be determined from a point of origin of a travel route or from another point along the travel route (e.g., after travel has begun).

In one embodiment, the system 100 may provide a modification of the operation of the vehicle to defer a transition time at which a transition occurs from the automatic mode to the manual mode to extend a period of time during which the vehicle is operated in the automatic mode beyond an earlier possible time at which the transition could occur. In various embodiments, the system 100 may initiate one or more actions to modify an operation of the vehicle for deferring the upcoming mode transition. In one embodiment, a deferral of the transition time occurs automatically when the human operator is engaged in an activity requiring attention. For example, the system 100 may utilize information from one or more sensors in the vehicle to determine if the user is engaged in activity, what type of activity, whether or not the user may be able to respond to a deferral notification/option, or the like information. In one scenario, the system 100 may initiate providing the modification for a deferral of a mode transition if the user is engaged in an activity that would require a deferral and the user may not be able to timely and reasonably be expected to respond to any notifications from the system 100.

In one embodiment, the system 100 may determine a duration of the deferral time based on an estimated amount of time that a user activity may take from beginning to end. In one embodiment, a duration of the deferral time may be based on an estimated reaming amount of time for the user to complete the user activity. For example, the vehicle is traveling along a travel route and the system 100 determines an upcoming transition point/time, but the system 100 may determine that a user activity is incomplete (e.g., may have been estimated to be completed before a transition point/time). The system 100 may utilize information about the user activity and a remaining time to completion, wherein the remaining time can be used to determine a duration of a deferral time. Further, the system 100 may determine one or more options for providing a deferral based on the determined duration of the deferral time.

In one embodiment, the system 100 may determine a duration of a deferral time that may be necessary and cause the vehicle to slow down a speed of travel of the vehicle, wherein a reduction in the speed would cause a delay in arriving at a transition point by at least the same amount of time as the duration of the deferral time. For example, the system 100 may determine from user activity that the user needs about five minutes to finish a conference call. The system 100 may determine a distance to the transition point and calculate to slow down the speed of the vehicle such that it will take at least five minutes to arrive at the transition point. In one embodiment, the system 100 may use a threshold value for a duration of a deferral time for which it may use the technique of slowing down the speed of a vehicle in order to meet the duration of the deferral time. For example, the threshold may be for only a few minutes (e.g., 5-10 minutes) and may be predetermined by the system 100, the user of the vehicle, regulatory bodies, or the like.

In one embodiment, the system 100 may cause a vehicle to travel on an alternative route. In some instances, the alternative route may be selected from the point of origin or the vehicle may be rerouted to an alternative route at some point along a current travel route but prior to a transition point or time. In one example, at a point of origin of a travel plan, the system 100 may determine that a user of the vehicle will be engaged in an activity, which may not be completed before arriving at a transition point if a travel route "X" is selected; therefore, the system 100 may suggest/select an alternative route "Y", which may be a longer route or take more time to arrive at a transition point so that the user activity may be completed before arriving at the transition point.

In one embodiment, the system 100 may cause a vehicle to change its travel lane to a slower lane of a road upon which the vehicle travels. For example, different lanes of a road may have different minimum or maximum speed limits. The vehicle may be moved to a lane with a slower speed limit based on a duration of a deferral time that the user may need.

In one embodiment, the system 100 may cause a vehicle to stop temporarily at a standby location. In one embodiment, the system 100 may determine a standby location based, at least in part, on the travel route information. In one example, the system 100 may utilize information about a travel route to identify one or more potential standby locations for the vehicle in case a stop for a period of time may be useful or necessary. Standby areas/locations may be rest areas, truck stops, emergency stop areas, road shoulders or parking lots. Standby locations may include commercial locations, such as business or public areas, such as parking areas associated with parks or municipal buildings. Standby locations may also include especially constructed areas specifically built and designated as standby areas. Standby locations may be provided with facilities, such as restrooms, battery charging stations, food, fuel, or entertainment. Standby locations may have the capacity to provide room for a single vehicle or a plurality of vehicles. Vehicle passengers may remain in their vehicles when at a standby location, or alternatively, vehicle passengers may leave their vehicles temporarily while at some standby locations. In one embodiment, standby locations include appropriate monitoring equipment to determine the occupancy of the standby station. The monitoring equipment includes appropriate scheduling features (implemented by suitable hardware and software) and coordinates usage of standby locations so that a vehicle is not routed to a standby location that is fully occupied. The monitoring equipment takes into account the routing schedules of the vehicles using the standby location (as well as other standby locations) so that a vehicle is routed to a standby location that has room for it. Standby locations may be identified in a map database used by the vehicle to determine various standby locations (e.g., along or near one or more travel routes) including parking lot data, daily parking and time of day information, distance/time thresholds between a current position of the vehicle and one or more upcoming transition points. Standby location information may also indicate sizes of spaces available at the standby location, possible services available at the standby location for the user and/or the vehicle, or the like information. Once a standby location is determined, its location may be utilized to compare to a current location of the vehicle and one or more upcoming transition points. The map data may be indicative of possible transition points that may be along one or more travel routes leading to the standby locations. In various examples, the system 100 may utilize detailed information/attributes about the potential standby locations for selecting/recommending a standby location. For instance, the system 100 may determine an estimated time to reach a standby location, how will the time affect an upcoming transition point/time, ease of access, traffic conditions on access routes to the standby location, types of access routes to the standby location, etc.

In one embodiment, a rerouting of the vehicle and/or the determining of the standby location may be further based, at least in part, on contextual information, traffic information, weather information, or a combination thereof. In one embodiment, for determining contextual information about the user, one or more elements of the system 100 may interact with various sensors (e.g., camera, microphones, motion sensors, etc.) in the vehicle to determine user activity in the vehicle and/or status of the vehicle systems, for example, to determine if the user is on a conference call, is watching a movie, is playing a video game, is not feeling well, or the like information. In one embodiment, for contextual information about the vehicle, the system 100 may interact with various sensors at the vehicle to determine and analyze information about the status of different systems of the vehicle. In one embodiment, the system 100 may collect and analyze traffic and weather information at the location of the vehicle. In various scenarios, the analyzed information about the user, the vehicle, the traffic and the weather may be utilized to determine a rerouting and a standby location for the vehicle, wherein the rerouting may be to another route or to a standby location.

In one embodiment, a standby location provides a space for a vehicle to stop at the standby location for a duration of time, wherein the system 100 may estimate a duration of time for the deferral based on an estimated time of travel to arrive at a transition point or a transition time and an estimated amount of time that a user may require or wish for (e.g., to complete one or more user activities.) In one example, for deferral of a transition of an operation mode of a vehicle, the vehicle may be rerouted to and stay at a standby location for at least a period of time as an estimated duration of time for the deferral.

In one embodiment, a standby location provides a space for a vehicle to stop at the standby location for a duration of time while the vehicle may be in an automatic mode. In one scenario, a vehicle may arrive at a standby location in an automatic mode and remain in an automatic mode, wherein a user of the vehicle is not required to interact with the vehicle while at the standby location.

In one embodiment, a standby location provides a space for a vehicle to stop at the standby location for a duration of time while one or more passengers remain in the vehicle. In various scenarios, the standby location may provide one or more services/features/amenities so that passengers of the vehicle may remain in the vehicle. For example, the standby location may provide a space where passengers of the vehicle may continue with their activities in the vehicle.

In one embodiment, a standby location may be accessible along the road network via one or more roads on which the vehicle can be operated in the automatic mode. In one scenario, the system 100 may select a standby location such that a vehicle operating in an automatic mode (e.g., driver engaged in an activity) at a current location may continue operating in the automatic mode, and travel on one or more roads while in the automatic mode for arriving at the standby location.

In one embodiment, the system 100 may select a standby location so that energy usage by the vehicle decreases when the vehicle is at the standby location. In one scenario, operation of one or more systems of the vehicle may be suspended while the vehicle is stopped at the standby location. For example, while at the standby location, the vehicle may be protected from environmental elements and without a need for a regular amount of energy to maintain an interior cabin environment for occupants in the vehicle.

In one embodiment, the system 100 may select a standby location so that carbon emissions by the vehicle decrease when the vehicle is at the standby location. In one scenario, the standby location may provide clean power (e.g., electricity) to the vehicle so it reduces/does not use its own power generating mechanism (e.g., gas powered engine) while at the standby location. In another scenario, the standby location may utilize a mechanism/system to capture some of the carbon emissions generated by the vehicle while it is at the standby location. For example, the vehicle may continue running its gas powered engine to power its systems, but an apparatus at the standby location may connect to the vehicle exhaust system to capture/reduce carbon emissions released into the atmosphere.

In one embodiment, the system 100 may determine an availability of space at one or more target standby locations prior to routing a vehicle for stopping at any of the target stand by locations. For example, the system 100 may access various local or remote databases (e.g., reservation system, service providers, etc.) for the availability information. In one embodiment, the system 100 may access crowd-source information that may be available via other vehicles that may be at a target standby location.

In one embodiment, the system 100 may coordinate a usage of the standby location with one or more other vehicles. In some scenarios, the system 100 may share or request information about a standby location that it is planning to use for one or more vehicles. For example, the usage may be coordinated via one or more map databases or via vehicle-to-vehicle (e.g., cars on the same road and traveling in the same direction) local communications. In one scenario, the coordination may be done by sharing the travel plans with other vehicle/users prior to start of a travel. In one embodiment, the at least one standby location includes, at least in part, one or more areas for queueing one or more vehicles to travel together in one or more formations. In one example, some vehicles may be rerouted to one or more standby locations so they may organize into one or more formations (e.g., "road trains"), wherein the vehicles may travel together, in closely spaced formations, in the same direction and at higher speeds.

In one embodiment, the system 100 may cause, at least in part, a presentation of at least one notification, to the human operator, of at least one transition time. In various embodiments, the notification may be provided while the vehicle is in the automatic mode, prior to the vehicle traveling on the road, and/or prior to the at least one transition time or at least one transition point. In one embodiment, the at least one notification may include at least one option to initiate a deferral of the at least one transition. In one scenario, prior to the transition time or arriving at the transition point, the system 100 may generate and present a notification, to a user of the vehicle (e.g., via a device in the vehicle or a user device), including information about an upcoming transition of an operating mode of the user vehicle to another operating mode. Also included in the notification may be one or more options for the user of the vehicle or an element of the system 100 to defer the transition of the vehicle operating mode.

In one embodiment, the system 100 may receive an input indicating a selection of the at least one option to initiate the deferral of the at least one transition. In one example, a user may be engaged in an activity (e.g., watching a movie, an online meeting, playing a video game, etc.) and may select an option to defer the transition until finished with the activity. In another example, a user may be busy with a task or may be incapacitated and as a result, unable to respond to the notification/options. In that case, one or more elements of the system 100 may cause a selection of an option to defer the upcoming transition.

In one embodiment, the system 100 may determine when to initiate the presentation of the at least one notification based, at least in part, on one or more locations of the at least one standby location. In one example, the system 100 may initiate a presentation of a notification of an upcoming transition based on locations of available standby locations. In one example, a notification may include additional information about the available standby locations and options to select one or more of the standby locations. In one embodiment, the at least one standby location includes, at least in part, one or more permanent standby locations, one or more dynamically-determined standby locations, or a combination thereof. In some scenarios, the standby locations may include, as allowed by their proprietors, parking lots of facilities/areas such as stadiums, shopping malls, schools, bus stations, train stations, open fields, or the like locations located along major highways as sometimes (e.g., when there are no events or special occasions) there may be unused capacity.

In one embodiment, the system 100 may select the modification based on an activity of the human operator. In one embodiment, one or more elements of the system 100 may interact with various sensors (e.g., camera, microphones, motion sensors, etc.) in the vehicle to determine a user activity in the vehicle and/or status of the vehicle systems (e.g., may be in use by the user), for example, determine if the user is on a conference all, is watching a movie, is playing a video game, is not feeling well, or the like information. In one embodiment, the system 100 may analyze user activity data for use in determining a modification of an operation of the vehicle. For example, if analysis of the user activity data indicates that the user needs only 5-10 minutes, then the modification may be to slow down to cause a delay in arriving at a transition point. In another example, if the analysis of the user activity data indicates that the user is on a video conference call that may last another 20 minutes, then the modification may be to reroute to a standby location with no/limited noise and traffic.

In one embodiment, the system 100 may identify a land-based passenger-carrying vehicle that travels on a road network and has an automatic mode, wherein one or more systems may control travel of the vehicle on the road network. Also, the system 100 may identify a vehicle having a manual mode in which real-time input from a human operator may control travel on the road network. In one embodiment, the system 100 may determine one or more roads of a road network where a vehicle may travel in an automatic mode, wherein the system 100 causes the vehicle to travel on the one or more roads in the automatic mode.

In one embodiment, the system 100 may route a vehicle to stop at a standby location for a duration of time while the vehicle is in an automatic mode. In one embodiment, the system 100 determines and selects a standby location such that a vehicle stopped at that standby location will be allowed to remain in an automatic mode. In one scenario, a vehicle may travel to and arrive at a standby location in an automatic mode, wherein the vehicle may remain in the automatic mode so that a user of the vehicle is not required to interact with the vehicle while at the standby location.

In one embodiment, after stopping a vehicle, while in an automatic mode, at a standby location, the system 100 may cause the vehicle to transition to a manual mode. In one scenario, the transition to the manual mode may be based on an example where a user completed a user activity and initiates or is able to take control of the vehicle. In another scenario, the transition to the manual mode may be based on a requirement of the standby location; for example, for safety reasons, based on regulations, etc. after stopping at the standby location, transition the vehicle to the manual mode.

In one embodiment, the system 100 may determine a duration of a stopping of a vehicle at a standby location based on an activity of a human operator of a vehicle. In one embodiment, the system 100 may determine/estimate a duration of time required for completing a user activity from beginning to end of the activity. In another scenario, the duration of time may be based on a remaining time to complete the user activity. In various embodiments, the standby location is identified in a map database used by the vehicle, and wherein the standby location is accessible along the road network via one or more roads on which the vehicle can be operated in the automatic mode.

In one embodiment, the system 100 may determine the one or more permanent standby locations, the one or more dynamically-determined standby locations, or a combination thereof from one or more records of at least one mapping database. In various scenarios, the system 100 may interface with one or more private, public, government, or the like databases to access and analyze mapping/geographical information about potential permanent or dynamically-determined standby locations for rerouting vehicles to. In one embodiment, the system 100 may update the databases (as allowed) with new or corrected information about the standby locations. In one embodiment, the system 100 may collect crowd-source data for updating the databases.

In one embodiment, the system 100 may determine a recommended duration of the deferral of the at least one transition based, at least in part, on user activity information, traffic management information, or a combination, wherein the at least one notification further includes the recommended duration. In one example, the system 100 may estimate and recommend a duration of the deferral based on an estimated time of travel to arrive at a transition point or a transition time and an estimated amount of time that a user may require or request (e.g., to complete one or more user activities.) In one example, a recommended duration of the deferral may be based on traffic, weather, activities (e.g., construction, emergency services, etc.), etc. near the location of the vehicle. In one embodiment, a notification may include information about a recommended duration of a deferral and associated options.

As shown in FIG. 1, in one embodiment, the system 100 may include a vehicle 101 that may operate in an autonomous, semi-autonomous, or manual mode. The vehicle 101 may include an embedded system 103 including a vehicle operating mode (VOM) manager 105, one or more applications 107 (applications 107), a data collection (DC) module 109, and sensors 111. The embedded system 103 may execute the applications 107 and utilize the DC module 109, the sensors 111, and/or one or more other control systems in the vehicle 101 for effectuating an operating mode of the vehicle 101. In various embodiments, the embedded system 103 and/or one or more components of the vehicle 101 may communicate with one or more components of the system 100 directly or through a common communication network 113.

The VOM manager 105 may interact with one or more components of the vehicle 101 and/or the system 100 for managing an operating mode of the vehicle 101. In one embodiment, the VOM manager 105 may determine a transition point or time where an operating mode of the vehicle 101 may need to transition to a different mode. For example, an autonomous/automatic mode may need to transition to a manual or semi-autonomous mode. In various scenarios, the VOM manager 105 may interface with a navigation device/system of the vehicle 101 for determining a geographical destination point (e.g., user workplace, restaurant, etc.), a travel route and information about the travel route. In one embodiment, the VOM manager 105 may analyze information about the user activity, environmental status at the vehicle location, travel route conditions, or the like information for determining if an upcoming transition of the vehicle operating mode (e.g., due to a transition time/point) should be deferred. (Further details related to the VOM manager 105 will be described below with respect to FIG. 3).

The applications 107 may include one or more applications for navigation, security, games, social networking, web browser, media playback, user interface (UI), mapping, web client, communications, etc. The DC module 109 may be utilized for determining and/or collecting data associated with the vehicle 101 and/or one or more other components of the system 100. In various embodiments, the DC module 109 may include one or more location modules, magnetometer modules, accelerometer modules, sensors module, and multimedia modules, or the like components for capturing and analyzing data relative to each module. For example, an accelerometer module may be used to determine an acceleration of a vehicle. In various scenarios, the DC module 109 may interface with the sensors 111 for accessing or processing data associated with the sensors, respectively.

By way of example, the sensors 111 may be any type of sensor. In certain embodiments, the sensors 111 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., information on road attributes may be determined from road signs by cameras and image recognition techniques), an audio recorder for gathering audio data, velocity sensors, and the like. In another embodiment, the sensors 111 may include light sensors, orientation sensors augmented with height sensor and acceleration sensor, tilt sensors to detect the degree of incline or decline of the vehicle along a path of travel, moisture sensors, pressure sensors, etc. In a further example embodiment, sensors about the perimeter of the vehicle may detect the relative distance of the vehicle from lanes or roadways, the presence of other vehicles, pedestrians, traffic lights, road features (e.g., curves) and any other objects, or a combination thereof. In one scenario, the sensors 111 may detect weather data, traffic information, or a combination thereof. Other sensors may include an odometer sensor, a speedometer sensor, a steering control sensor, or the like, which may be utilized by control systems, for example, of an autonomous or semi-autonomous vehicle.

In one embodiment, the system 100 may include service providers 115a-115n (also collectively referred to as service providers 115), including one or more service providers, may offer one or more services; for example, location based services, navigation services, autonomous driving services, social networking services, content sharing, account management services, or a combination thereof. In one embodiment, the service providers 115 may include and/or have access to one or more service databases 117a-117n (also collectively referred to as service database 117), which may include various mapping data, user information, user profiles, user preferences, one or more profiles of one or more user devices (e.g., device configuration, sensors information, etc.), information on the service providers 115, and the like.

In one embodiment, the system 100 may include content providers 119a-119n (also collectively referred to as content providers 119), including one or more content providers, that may provide various content items to one or more entities of the system 100. In one embodiment, the content providers may include and/or have access to one or more content databases 121a-121n (also collectively referred to as content database 121), which may store, include, and/or have access to various content items. For example, the content providers 119 may store content items (e.g., at the content database 121) provided by various users, various service providers, crowd-sourced content, or the like. Further, the service providers 115 and/or the content providers 119 may utilize one or more service application programming interfaces (APIs)/integrated interface, through which communication, media, content, and information (e.g., associated with users, applications, services, content, etc.) may be shared, accessed and/or processed.

In various embodiments, the service providers 115 and/or the content providers 119 may include and/or have access to a geographic database 123, which may include information (e.g., POIs, objects, weather, people, etc.) associated with given geographical areas. The information may be available from various public, private, or government controlled databases, where the information may be requested or accessed by one or more entities of the system 100 via the communication network 113. In one embodiment, the system 100 includes an infrastructure for sharing geospatial information in real-time on multiple devices that includes a map-based service, application, and/or web interface that may provide various map UIs. By way of example, the map-based service, application, and/or interface can be provided over the communication network 113 by the service providers 115.

In one embodiment, the system 100 may include one or more user equipment (UE) 125a-125n (also collectively referred to as a UE 125 and/or UEs 125), which may be utilized to execute one or more applications 107a-107n same or similar to the applications 107 of the vehicle 101. In one embodiment, the UEs 125 may include DC modules 109a-109n same or similar to the DC module 109 of the vehicle 101.

In various embodiments, the embedded system 103 and/or one or more components/systems of the vehicle 101 may be configured to interface directly with the service providers 115 for various map, location-based, and/or other related services. In addition, one or more components/systems of the vehicle 101 and/or the service providers 115 may interface with the content providers 119 that can provide/deliver content of various types (e.g., geospatial information, mapping content, navigation content, travel content, locality content, etc.) upon request. Requests may be initiated via the communication network 113 and/or one or more satellites 127a-127n by way of one or more location based applications 107 executing by one or more components/systems of the vehicle 101 and/or on the UEs 125 that are further associated with respective users. By way of example, the applications 107 may access turn-by-turn navigation, routing information, maps, driving instructions, etc., for accessing, annotating, and/or sharing geospatial information. In one embodiment, the system 100 or components thereof can store and/or retrieve geospatial information, service information, and/or other related information in the geographic database 123 (further described below with respect to FIG. 2).

In one embodiment, the system 100 includes software to enhance the applications 107, the service providers 115, the content providers 119 and/or any other component of the system 100 to determine a transition point/time for an operating mode of a vehicle and presenting notifications and options. It is contemplated that the transition, deferral, and notification services need not be associated with a navigational route. Accordingly, in one embodiment, the system 100 can be used to provide entertainment and/or other services of relevance to a user in a vehicle environment. In one embodiment, the notification or transition service information may be saved on the participating users' UEs 125 or the vehicle 101 devices/systems. In one embodiment, other users may be able to access a user's route information, service information, estimated time of arrival, sharing information, location sharing information, speed sharing information, and other like user/vehicle service information.

By way of example, the UE 125 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 125 can support any type of interface to the user (such as "wearable" circuitry, etc.).

By way of example, the applications 107 may be any type of application that is executable by one or more systems/components of the vehicle or the UE 125, such as communication services (e.g., texting applications, calling applications, etc.), location-based service applications, navigation applications, camera/imaging application, media player applications, social networking applications, calendar applications, and the like. In one scenario, users are able to select a destination via one or more map applications.

The communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
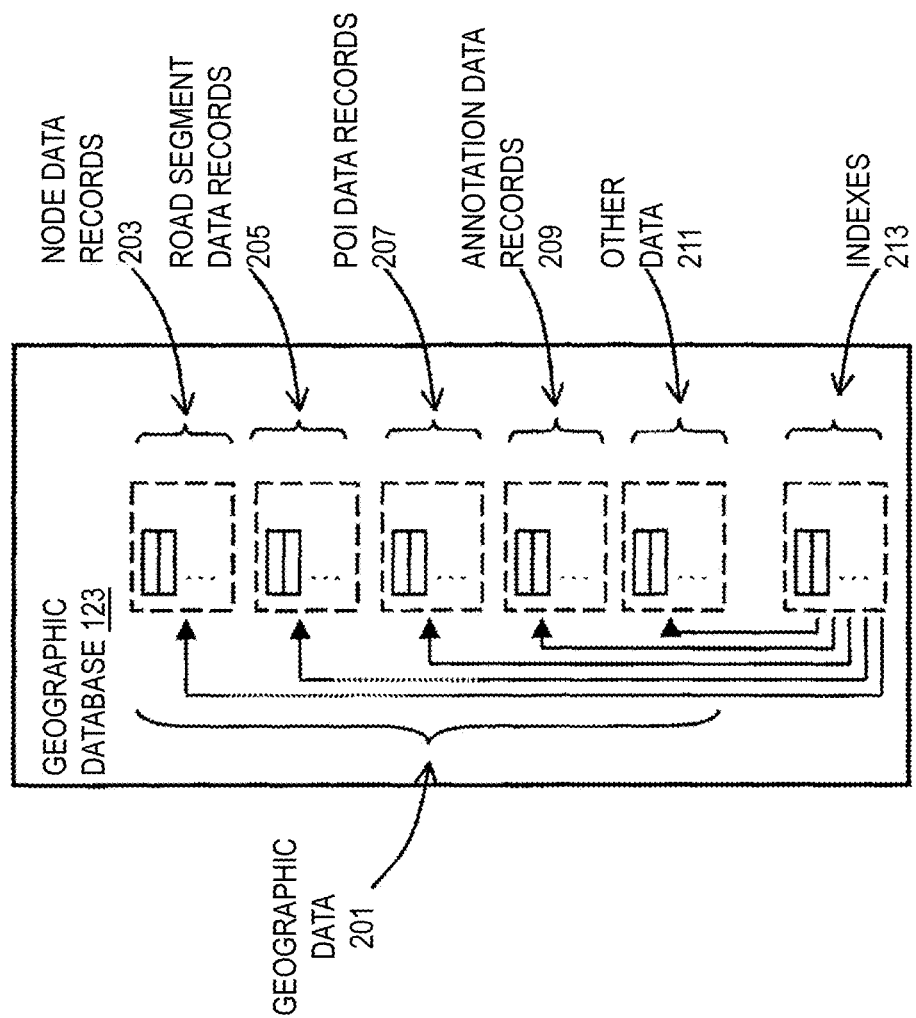
FIG. 2 is a diagram of a geographic database of the system 100, according to various embodiments.

FIG. 2 is a diagram of the geographic database of system 100, according to various embodiments. In the embodiments, notification and option information for reconfiguring an ASA vehicle environment and operating mode may be stored, associated with, and/or linked to the geographic database 123 or data thereof. In one embodiment, the geographic or map database 123 includes geographic data 201 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 123 includes node data records 203, road segment or link data records 205, POI data records 207, annotation data records 209, other data records 211, for example, wherein an index 213 may provide additional information about the records/data. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths that may be used in the calculated route or recorded route information to determine and present notifications and options to users for reconfiguring a vehicle environment or operating mode, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 123 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, requirements/restrictions on vehicle configuration/operating mode, and other navigation related attributes. Some attributes may indicate that road link and nodes of a road network may be designated for use by vehicles in an autonomous/automatic mode, semi-autonomous mode, manual mode, or a mixed-mode. Such attributes may be used by the system 100 to determine appropriate routes for a vehicle in a given operating mode, mode transition points, as well as determining standby locations and a rerouting of the vehicle to the standby areas. Additionally, the attributes may indicate POIs (and associated parking lots/areas), such as standby locations for vehicles, gasoline stations, hotels, restaurants, museums, stadiums, offices, automobile dealerships, auto repair shops, buildings, stores, parks, etc. The geographic database 123 can include data about the POIs and their respective locations in the POI data records 207. The geographic database 123 can also include data about places, such as cities, towns, or other communities, and other geographic features, such as bodies of water, mountain ranges, etc. Such place or feature data can be part of the POI data 207 or can be associated with POIs or POI data records 207 (such as a data point used for displaying or representing a position of a city).

The geographic database 123 can be maintained by the content providers 107 in association with the service providers 115 (e.g., a map developer). A map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, may be used. Data for developing maps can also be obtained from probe data, i.e., data collected from end users devices that being operated in a geographic area.

The geographic database 123 can be a master geographic database stored in a format that facilitates updating, maintenance, and development. For example, the master geographic database 123 or data in the master geographic database 123 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 125, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device (e.g., an ASA vehicle system) developer can perform compilation on a received geographic database in a delivery format to produce one or more compiled navigation databases.

As mentioned above, the geographic database 123 can be a master geographic database, but in alternate embodiments, the geographic database 123 can represent a compiled navigation database that can be used in or with end user devices (e.g., UEs 125, embedded system 103, etc.) to provide navigation-related functions. For example, the geographic database 123 can be used with the end user device to provide an end user with navigation features. In such a case, the geographic database 123 can be downloaded or stored on the end user device, such as in applications 107, or the end user device can access the geographic database 123 through a wireless or wired connection (such as via a server and/or the communication network 113), for example.

In one embodiment, the end user device may be an in-vehicle (e.g., ASA vehicle) navigation system, a personal navigation device (PND), a portable navigation device, a cellular telephone, a mobile phone, a tablet, a personal digital assistant (PDA), a watch, a camera, a computer, and/or other device that can perform navigation-related functions, such as digital routing and map display. In one embodiment, the navigation device UE 125 can be a cellular telephone. An end user can use the device UE 125 for navigation functions such as guidance and map display, for example, and for ranking of one or more road links.

Figure 3:
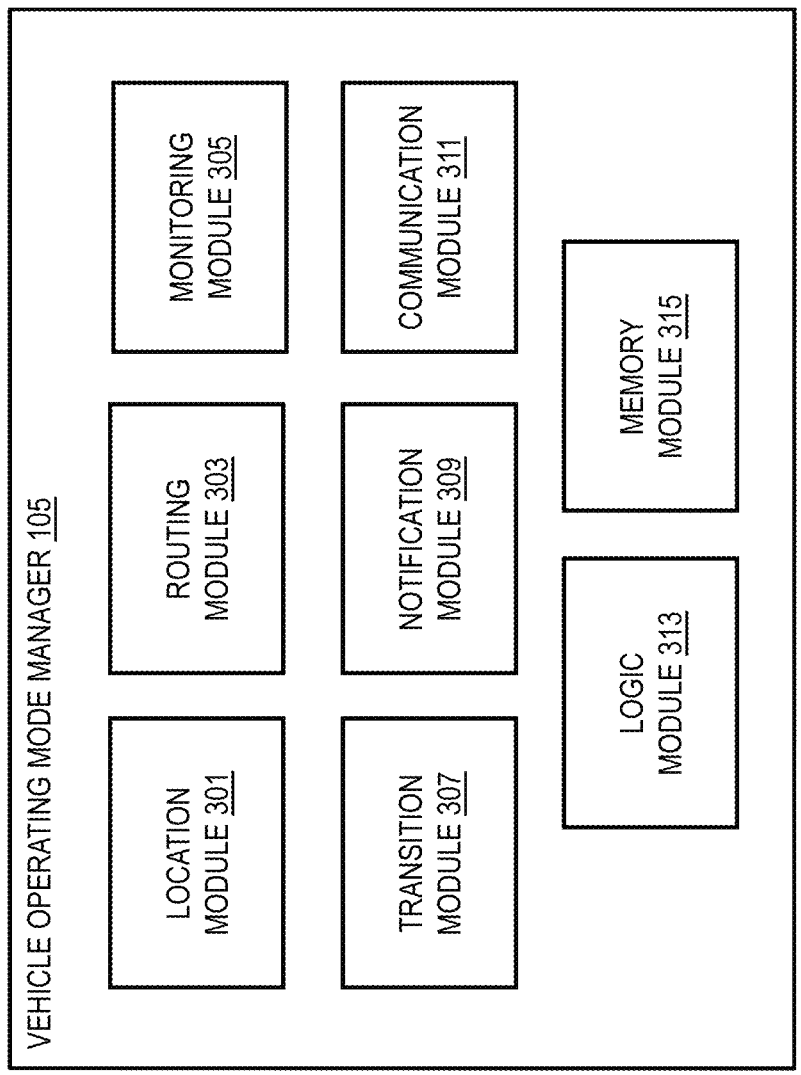
FIG. 3 is a diagram of the components of a vehicle operating mode manager, according to an embodiment.

FIG. 3 is a diagram of the components of a vehicle operating mode manager, according to an embodiment. By way of example, the VOM manager 105 may include one or more components for determining a vehicle operation mode transition point/time and managing a deferral of the transition point/time. It is contemplated that the functions of these components may be combined in one or more components or performed by other components of equivalent functionality. In one embodiment, the VOM manager 105 may include a location module 301, a routing module 303, a monitoring module 305, a transition module 307, a notification module 309, a communication module 311, a logic module 313, a memory module 315, or a combination thereof.

In one embodiment, the location module 301 can determine location of a vehicle 101, for example, via location information associated with one or more devices in the vehicle 101 and/or a UE 125 in the vehicle. The location information can be determined by a wireless network triangulation system, GPS, assisted GPS (A-GPS), Cell of Origin, or other location extrapolation technologies. Standard GPS and A-GPS systems can use satellites 127 to pinpoint the location of the vehicle 101. A Cell of Origin system can be used to determine the cellular tower that a cellular device in the vehicle 101 or a UE 125 may be synchronized with. This information provides a coarse location of the vehicle 101 because the cellular tower can have a unique cellular identifier (cell-ID) that can be geographically mapped. The location module 301 may also utilize multiple technologies to detect the location of the vehicle 101. In one embodiment, GPS coordinates are stored as context information in the memory module 315 and are available to the routing module 303, transition module 307, notification module 309, service providers 115, or to other entities of the vehicle 101 and/or the system 100 (e.g., via the communication module 311). Moreover, in certain embodiments, the GPS coordinates can include an altitude to provide a height. In other embodiments, the altitude can be determined using another type of altimeter.

In various scenarios, the routing module 303 may interface with a navigation device/system of the vehicle 101, or a UE 125 in the vehicle, for determining a geographical destination point (e.g., user workplace, restaurant, etc.), a travel route and related information about the travel route. Also, the routing module 303 may interact with the geographic database 123 and/or a service provider 115 for determining information about the travel route; for example, road class/type, an estimated time to reach a transition point, any restrictions related to an operating mode of the vehicle while travelling on the travel route, etc. In one embodiment, the routing module 303 may request/access one or more map databases to determine one or more routes to one or more standby locations, wherein the routing and the standby location information may be shared with or accessed by the transition module 307, the notification module 309, or one or more other components/system of the vehicle 101 for completing one or more tasks by the other modules/components. In one embodiment, a routing module 303 may be implemented in a non-autonomous vehicle, a vehicle capable of autonomous operation but being operated in manual mode, or at a service provider 115 for providing one or more services to the user of the vehicle. For example, if a road is congested due to an accident or inclement weather, the user may be provided with navigation guidance to a standby location instead of sitting in congested traffic where, for example, waiting in the standby location may be less polluting (e.g., less fuel) and less expensive (e.g., less wearing of vehicle components) than waiting in traffic. Also, if the volume of vehicles on a road causes traffic to become congested, some of the vehicles may be diverted to standby locations to keep the volume below the threshold.

In one embodiment, the monitoring module 305 may include algorithms to interface with and/or process user responses or data from sensors in a vehicle 101. In one embodiment, the monitoring module 305 may determine one or more responses from the one or more users in response to presentation of the notifications or options. For example, the monitoring module 305 may receive one or more inputs/selections from the occupants in response to the notifications and options associated with mode transition or routing options for the vehicle 101. In one example, the monitoring module 305 may interact with various sensors (e.g., camera, microphones, motion sensors, etc.) of the vehicle 101 (or a UE 125 in the vehicle) to determine driver/occupant activity in the vehicle. For example, to determine if the driver is on a conference all, is watching a movie, is playing a video game, is not feeling well, or the like information.

In one embodiment, the transition module 307 may utilize various algorithms and software for determining a vehicle 101 operation mode transition point/time that may be based on information associated with a location of the vehicle 101 (e.g., near a city center, a mountainous area, a freeway, moving, stationary, etc.), a destination point, a travel route, traveling speed of the vehicle 101, or the like information that may be useful in determining an upcoming transition point/time. The transition module 307 may access or request information from other modules of the VOM manager 105, other components/systems at the vehicle 101, and/or one or more components of the system 100 to determine one or more options for deferring an upcoming operating mode transition for the vehicle 101. In one example, the transition module 307 may utilize information from the location module 301 or the monitoring module 305 (e.g., user activity in the vehicle) any criteria predefined by the operator of the vehicle 101 and/or a regulatory body for determining one or more deferring options.

The notification module 309 may interact with one or more elements/components for generating and presenting notifications and options about a vehicle operating mode transition point/time to the operator/occupants/users of the vehicle. The notifications/options may be presented via one or more devices (e.g., video monitor, loud speakers, etc.) in the vehicle 101 and/or via a UE 125 in the vehicle 101. The users may utilize the same devices and/or other available devices in the vehicle 101 to interact with the notifications or options presented, and/or provide a one or more responses back to the notification module 309 or to one or more other modules. In one embodiment, the notification module 309 may determine a best/optimum mechanism/method for presenting a notification/option based on a type of notification/option, devices available in the vehicle 101, user activity in the vehicle 101, proximity to a transition point/time, or the like conditions.

In one embodiment, the communication module 311 may be used for communication between various elements of the system 100 as well as between modules, elements, components, or the like of the vehicle 101. For example, the communication module 311 may be used to communicate commands, requests, data, etc., to/from the transition module 307, applications 107, service providers 115, or the like.

In one embodiment, the logic module 313 may manage tasks, including tasks performed by the other modules. For example, although the other modules may perform their actual tasks, the logic module 313 may determine when and how those tasks are performed or otherwise direct the other modules to perform the task. In one embodiment, the logic module 313 may determine to process the one or more location traces in substantially real-time, batch mode, according to a schedule, or a combination thereof. By way of example, the schedule may be based, at least in part, on computational resources, amount of available data, etc.

In various embodiments, one or more modules or components of the embedded system 103 may interact with the memory module 315 for storing or retrieving data. For example, the transition module 307 may store information about standby locations that may be used to determine usage and features about them.

Figure 11:
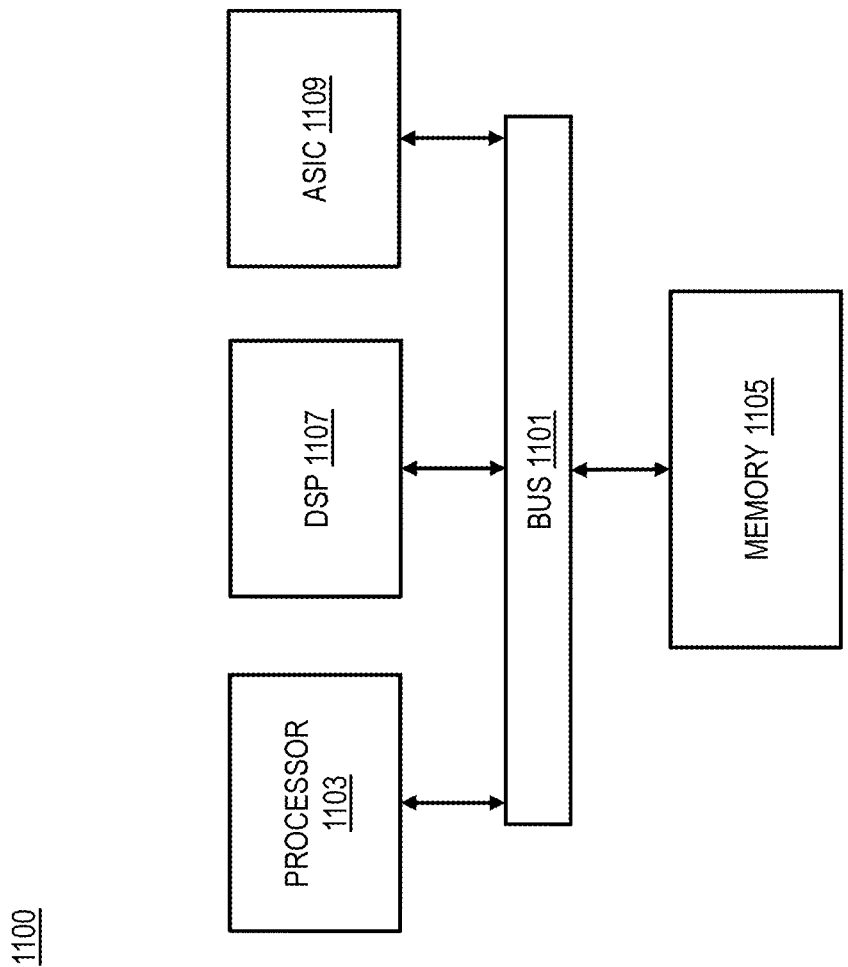
FIG. 11 is a diagram of a chip set that can be used to implement an embodiment of the proposed methods.

FIGS. 4 through 8 illustrate flowcharts of various processes for determining a transition point/time for an operating mode of a vehicle and initiating a deferral of a transition, according to various embodiments. In various embodiments, the system 100 or components thereof may perform one or more portions of the processes 400, 500, 600, 700, and 800 which may be implemented in, for instance, a chip set including a processor and a memory as shown in FIG. 11. As such, the system 100 or components thereof can provide means for accomplishing various parts of the processes as well as means for accomplishing other processes in conjunction with other components of the system 100. Throughout these processes, the VOM manager 105 may be referred to as completing various portions of the processes 400 through 800, however, it is understood that other components of the system 100 can perform some of and/or all of the process steps. Further, for clarity in discussing the processes 400 through 800, the VOM manager 105 or components thereof is/are referred to as completing various steps of said processes; however, said processes and/or example steps described therein may be performed in any suitable order and/or may be optional.

Figure 4:
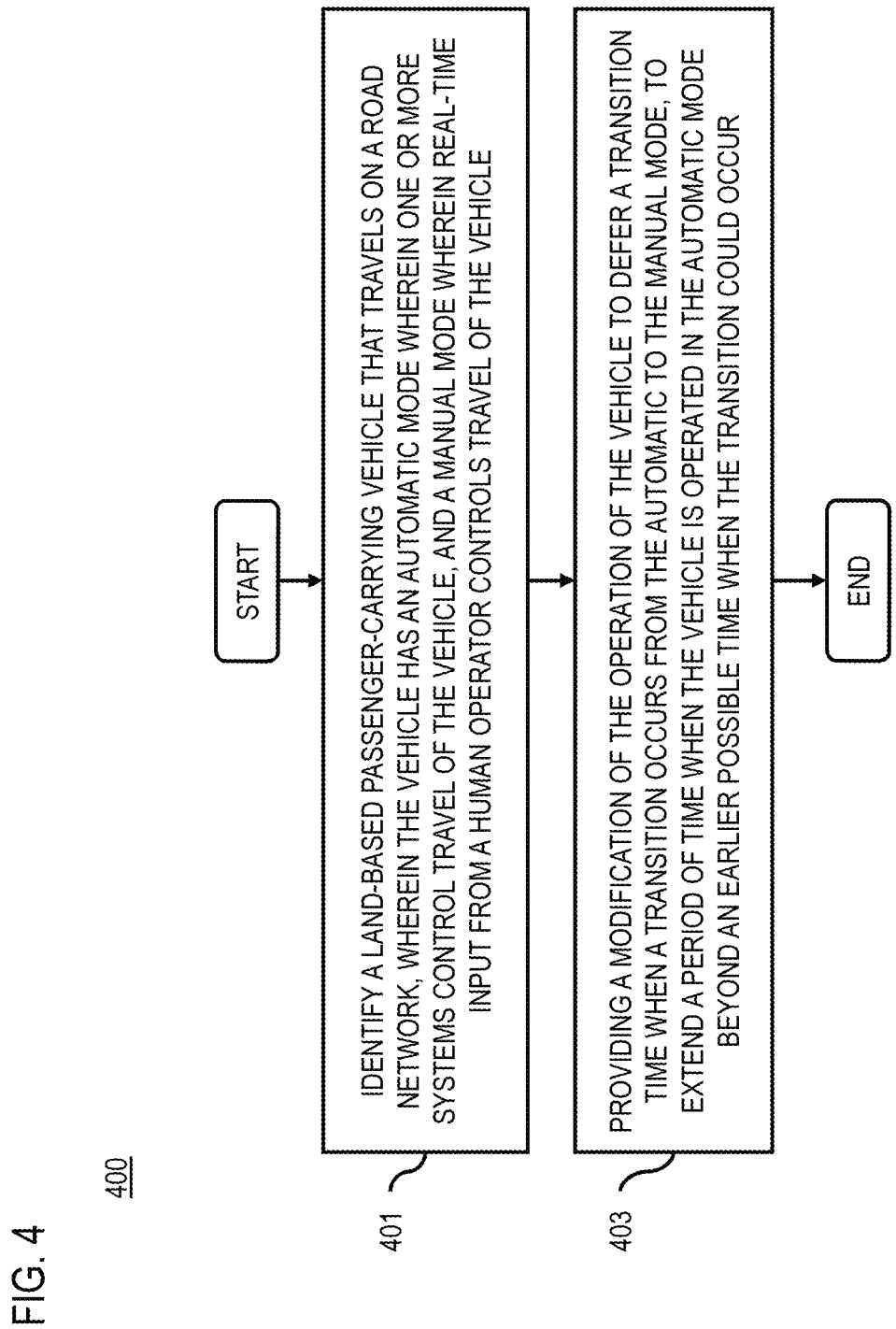

The process 400 may begin at step 401 of FIG. 4, where the VOM manager 105 may identify a land-based passenger-carrying vehicle that travels on a road network may operate in an automatic mode wherein one or more systems may control travel of the vehicle on the road network. The vehicle may also operate in a manual mode in which real-time input from a human operator may control travel on the road network. In one embodiment, the VOM manager 105 may determine routing information for a vehicle to operate in an autonomous mode for traveling to a destination point of a user. In various scenarios, one or more devices (e.g., a navigation system) in the vehicle or a user device (e.g., a mobile device) may collect and analyze information (e.g., from user input, travel itinerary, calendar, etc.) for travelling from a point of origin to a destination point. One or more elements of the system 100 may determine one or more travel routes to the destination point. A driver/user of the vehicle and/or an element of the system 100 may select one of the routes (e.g., based on user history, user preferences, route condition/type/class, etc.) for travelling to the destination point.

In one embodiment, the system 100 may process and/or facilitate a processing of information about a selected travel route to determine a transition time and/or a transition point for at least one transition of the operating mode of the vehicle between autonomous, semi-autonomous, and non-autonomous modes. In various scenarios, the system 100 may utilize one or more sources to determine information about the selected route, wherein the information may include details about the route class/type, any transition points (e.g., autonomous to non-autonomous) before arriving at the destination point, any restrictions related to a configuration of a vehicle using the route (e.g., non-autonomous only, autonomous only, mixed use, etc.), or the like information. In one scenario, the same information may be determined for the non-selected travel routes for comparison and possible recommendation to the driver/occupant(s). In one embodiment, the system 100 may utilize one or more applications, algorithms, or service providers to determine a transition time or a distance to the transition point where the operating mode of the vehicle may be required to transition, for example, to a semi-autonomous or non-autonomous mode. The transition time or distance to the transition point may be determined from a point of origin of a travel route or from another point along the travel route (e.g., after travel has begun).

At step 403, the VOM manager 105 may provide a modification of the operation of the vehicle to defer a transition time at which a transition occurs from the automatic mode to the manual mode to extend a period of time during which the vehicle is operated in the automatic mode beyond an earlier possible time at which the transition could occur. In various embodiments, the VOM manager 105 may initiate one or more actions to modify an operation of the vehicle for deferring the upcoming mode transition. In one embodiment, a deferral of the transition time occurs automatically when the human operator is engaged in an activity requiring attention. For example, the VOM manager 105 may utilize information from one or more sensors in the vehicle to determine if the user is engaged in activity, what type of activity, whether or not the user may be able to respond to a deferral notification/option, or the like information. In one scenario, the system 100 may initiate providing the modification for a deferral of a mode transition if the user is engaged in an activity that would require a deferral and the user may not be able to timely and reasonably be expected to respond to any notifications from the VOM manager 105.

In one embodiment, the system 100 may determine a duration of the deferral time based on an estimated amount of time that a user activity may take from beginning to end. In one embodiment, a duration of the deferral time may be based on an estimated reaming amount of time for the user to complete the user activity. For example, the vehicle is traveling along a travel route and the system 100 determines an upcoming transition point/time, but the system 100 may determine that a user activity is incomplete (e.g., may have been estimated to be completed before a transition point/time). The system 100 may utilize information about the user activity and a remaining time to completion, wherein the remaining time can be used to determine a duration of a deferral time. Further, the system 100 may determine one or more options for providing a deferral based on the determined duration of the deferral time.

Figure 5:
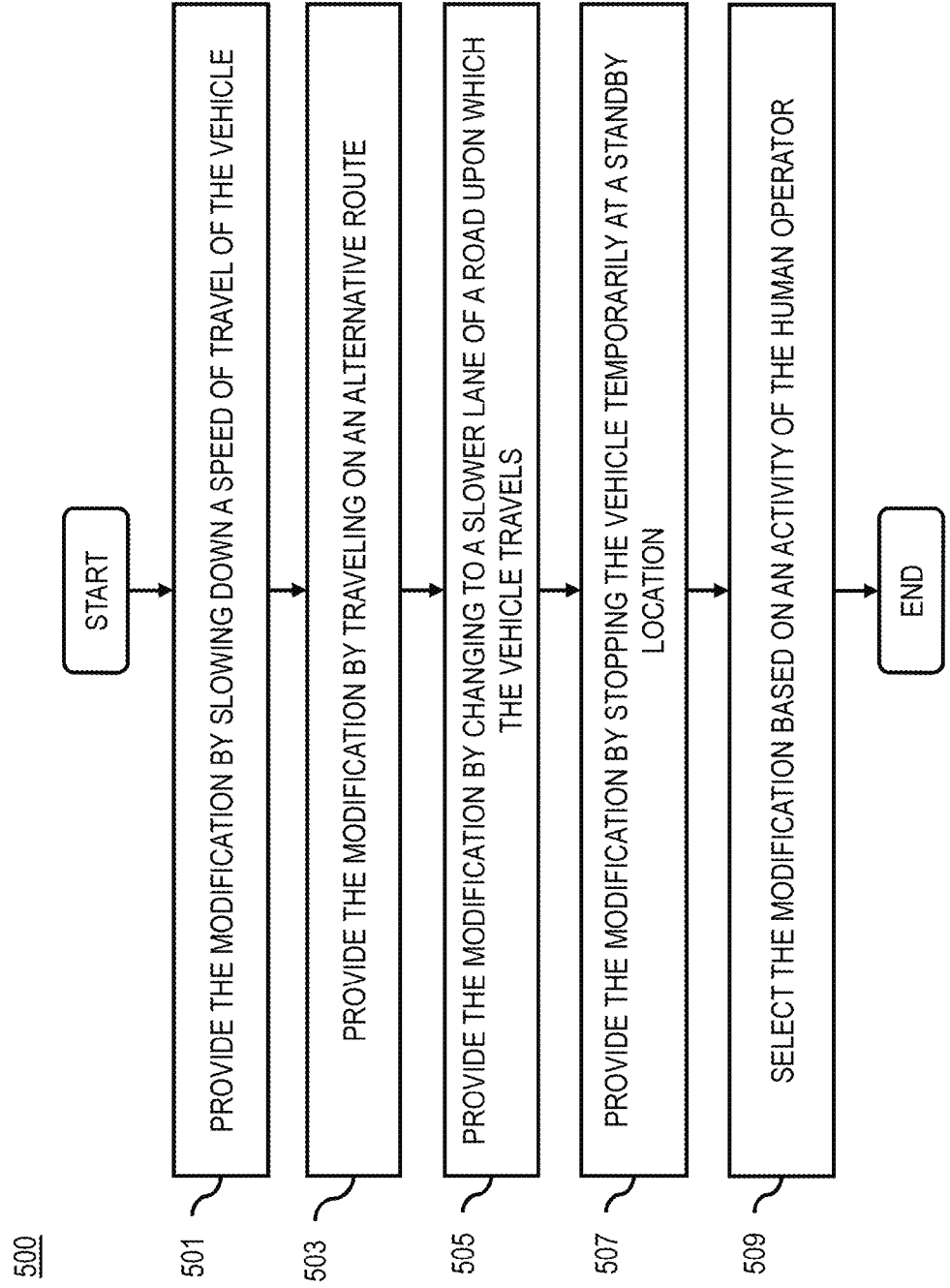

The process 500 may begin at step 501 of FIG. 5, where the VOM manager 105 may determine a duration of a deferral time that may be necessary and cause the vehicle to slow down a speed of travel of the vehicle, wherein a reduction in the speed would cause a delay in arriving at a transition point by at least the same amount of time as the duration of the deferral time. For example, the system 100 may determine from user activity that the user needs about five minutes to finish a conference call. The system 100 may determine a distance to the transition point and calculate to slow down the speed of the vehicle such that it will take at least five minutes to arrive at the transition point. In one embodiment, the system 100 may use a threshold value for a duration of a deferral time for which it may use the technique of slowing down the speed of a vehicle in order to meet the duration of the deferral time. For example, the threshold may be for only a few minutes (e.g., 5-10 minutes) and may be predetermined by the system 100, the user of the vehicle, regulatory bodies, or the like.

At step 503, the VOM manager 105 may cause a vehicle to travel on an alternative route. In some instances, the alternative route may be selected from the point of origin or the vehicle may be rerouted to an alternative route at some point along a current travel route but prior to a transition point or time. In one example, at a point of origin of a travel plan, the system 100 may determine that a user of the vehicle will be engaged in an activity, which may not be completed before arriving at a transition point if a travel route "X" is selected; therefore, the system 100 may suggest/select an alternative route "Y", which may be a longer route or take more time to arrive at a transition point so that the user activity may be completed before arriving at the transition point.

At step 505, the VOM manager 105 may cause a vehicle to change its travel lane to a slower lane of a road upon which the vehicle travels. For example, different lanes of a road may have different minimum or maximum speed limits. The vehicle may be moved to a lane with a slower speed limit based on a duration of a deferral time that the user may need.

At step 507, the VOM manager 105 may cause a vehicle to stop temporarily at a standby location. In one embodiment, the system 100 may determine a standby location based, at least in part, on the travel route information. In one example, the system 100 may utilize information about a travel route to identify one or more potential standby locations for the vehicle in case a stop for a period of time may be useful or necessary.

At step 509, the VOM manager 105 may select the modification based on an activity of the human operator. In one embodiment, one or more elements of the system 100 may interact with various sensors (e.g., camera, microphones, motion sensors, etc.) in the vehicle to determine a user activity in the vehicle and/or status of the vehicle systems (e.g., may be in use by the user), for example, determine if the user is on a conference all, is watching a movie, is playing a video game, is not feeling well, or the like information. In one embodiment, the system 100 may analyze user activity data for use in determining a modification of an operation of the vehicle. For example, if analysis of the user activity data indicates that the user needs only 5-10 minutes, then the modification may be to slow down to cause a delay in arriving at a transition point. In another example, if the analysis of the user activity data indicates that the user is on a video conference call that may last another 20 minutes, then the modification may be to reroute to a standby location with no/limited noise and traffic.

Figure 6:
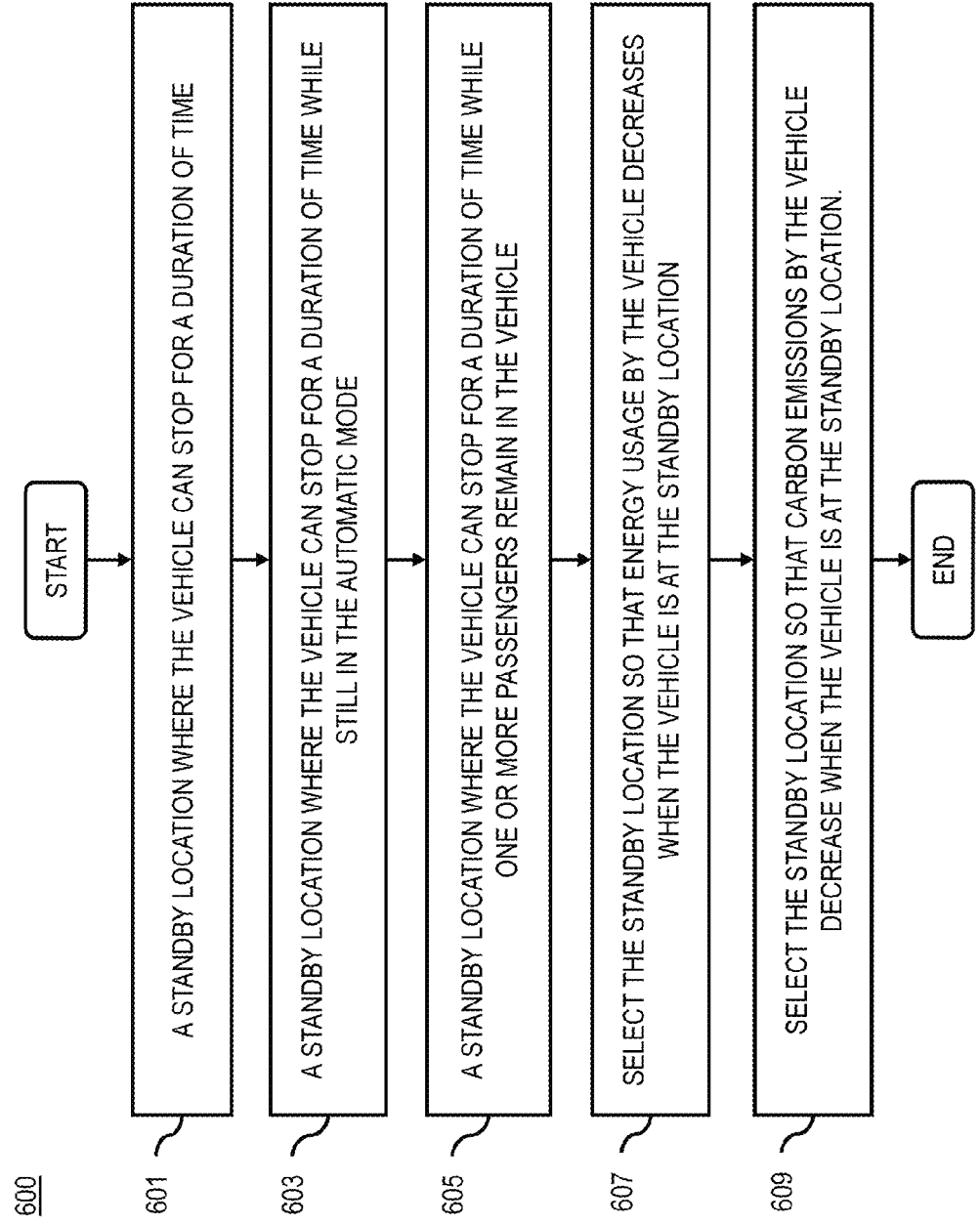

The process 600 may begin at step 601 of FIG. 6, where the VOM manager 105 may determine a standby location that provides a space for a vehicle to stop at the standby location for a duration of time, wherein the system 100 may estimate a duration of time for the deferral based on an estimated time of travel to arrive at a transition point or a transition time and an estimated amount of time that a user may require or wish for (e.g., to complete one or more user activities.) In one example, for deferral of a transition of an operation mode of a vehicle, the vehicle may be rerouted to and stay at a standby location for at least a period of time as an estimated duration of time for the deferral.

At step 603, the VOM manager 105 may determine a standby location that provides a space for a vehicle to stop at the standby location for a duration of time while the vehicle may be in an automatic mode. In one scenario, a vehicle may arrive at a standby location in an automatic mode and remain in an automatic mode, wherein a user of the vehicle is not required to interact with the vehicle while at the standby location.

At step 605, the VOM manager 105 may determine a standby location that provides a space for a vehicle to stop at the standby location for a duration while one or more passengers remain in the vehicle. In various scenarios, the standby location may provide one or more services/features/amenities so that passengers of the vehicle may remain in the vehicle. For example, the standby location may provide a space where passengers of the vehicle may continue with their activities in the vehicle.

At step 607, the VOM manager 105 may determine a standby location so that energy usage by the vehicle decreases when the vehicle is at the standby location. In one scenario, operation of one or more systems of the vehicle may be suspended while the vehicle is stopped at the standby location. For example, while at the standby location, the vehicle may be protected from environmental elements and without a need for a regular amount of energy to maintain an interior cabin environment for occupants in the vehicle.

At step 609, the VOM manager 105 may determine a standby location so that carbon emissions by the vehicle decrease when the vehicle is at the standby location. In one scenario, the standby location may provide clean power (e.g., electricity) to the vehicle so it reduces/does not use its own power generating mechanism (e.g., gas powered engine) while at the standby location. In another scenario, the standby location may utilize a mechanism/system to capture some of the carbon emissions generated by the vehicle while it is at the standby location. For example, the vehicle may continue running its gas powered engine to power its systems, but an apparatus at the standby location may connect to the vehicle exhaust system to capture/reduce carbon emissions released into the atmosphere.

Figure 7:
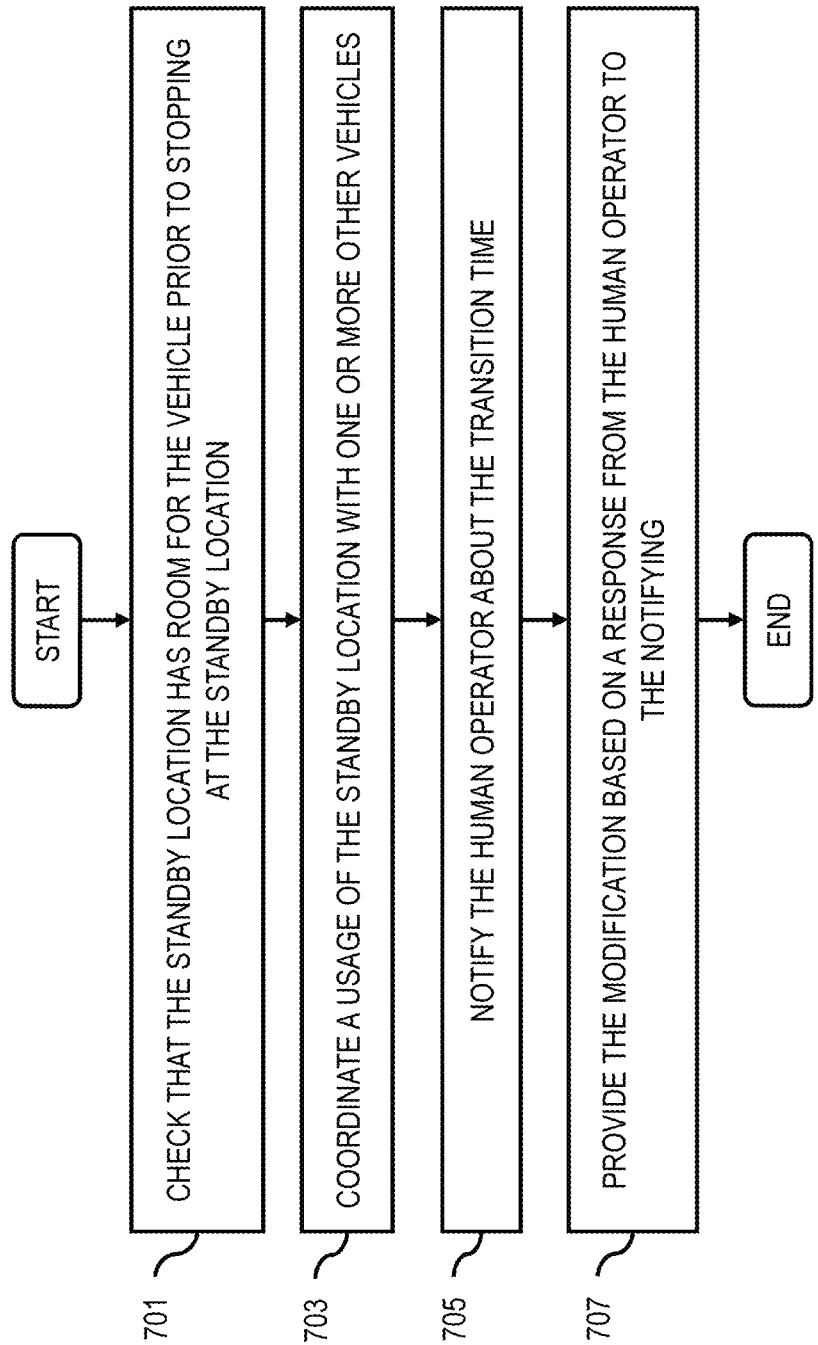

The process 700 may begin at step 701 of FIG. 7, where the VOM manager 105 may determine an availability of space at one or more target standby locations prior to routing a vehicle for stopping at any of the target stand by locations. For example, the system 100 may access various local or remote databases (e.g., reservation system, service providers, etc.) for the availability information. In one embodiment, the system 100 may access crowd-source information that may be available via other vehicles that may be at a target standby location.

At step 703, the VOM manager 105 may coordinate a usage of the standby location with one or more other vehicles. In some scenarios, the system 100 may share or request information about a standby location that it is planning to use for one or more vehicles. For example, the usage may be coordinated via one or more map databases or via vehicle-to-vehicle (e.g., cars on the same road and traveling in the same direction) local communications. In one scenario, the coordination may be done by sharing the travel plans with other vehicle/users prior to start of a travel. In one embodiment, the at least one standby location includes, at least in part, one or more areas for queueing one or more vehicles to travel together in one or more formations. In one example, some vehicles may be rerouted to one or more standby locations so they may organize into one or more formations (e.g., "road trains"), wherein the vehicles may travel together, in closely spaced formations, in the same direction and at higher speeds.

At step 705, the VOM manager 105 may cause, at least in part, a presentation of at least one notification, to the human operator, of at least one transition time. In various embodiments, the notification may be provided while the vehicle is in the automatic mode, prior to the vehicle traveling on the road, and/or prior to the at least one transition time or at least one transition point. In one embodiment, the at least one notification may include at least one option to initiate a deferral of the at least one transition. In one scenario, prior to the transition time or arriving at the transition point, the system 100 may generate and present a notification, to a user of the vehicle (e.g., via a device in the vehicle or a user device), including information about an upcoming transition of an operating mode of the user vehicle to another operating mode. Also included in the notification may be one or more options for the user of the vehicle or an element of the system 100 to defer the transition of the vehicle operating mode.

At step 707, the VOM manager 105 may receive an input indicating a selection of the at least one option to initiate the deferral of the at least one transition. In one example, a user may be engaged in an activity (e.g., watching a movie, an online meeting, playing a video game, etc.) and may select an option to defer the transition until finished with the activity. In another example, a user may be busy with a task or may be incapacitated and as a result, unable to respond to the notification/options. In that case, one or more elements of the system 100 may cause a selection of an option to defer the upcoming transition.

The process 800 may begin at step 801 of FIG. 8, where the VOM manager 105 may identify a land-based passenger-carrying vehicle that travels on a road network and has an automatic mode, wherein one or more systems may control travel of the vehicle on the road network. Also, the system 100 may identify a vehicle having a manual mode in which real-time input from a human operator may control travel on the road network. In one embodiment, the system 100 may determine one or more roads of a road network where a vehicle may travel in an automatic mode, wherein the system 100 causes the vehicle to travel on the one or more roads in the automatic mode.

At step 803, the VOM manager 105 may route a vehicle to stop at a standby location for a duration of time while the vehicle is in an automatic mode. In one embodiment, the system 100 determines and selects a standby location such that a vehicle stopped at that standby location will be allowed to remain in an automatic mode. In one scenario, a vehicle may travel to and arrive at a standby location in an automatic mode, wherein the vehicle may remain in the automatic mode so that a user of the vehicle is not required to interact with the vehicle while at the standby location.

At step 805, after stopping a vehicle, while in an automatic mode, at a standby location, the VOM manager 105 may cause the vehicle to transition to a manual mode. In one scenario, the transition to the manual mode may be based on an example where a user completed a user activity and initiates or is able to take control of the vehicle. In another scenario, the transition to the manual mode may be based on a requirement of the standby location; for example, for safety reasons, based on regulations, etc. after stopping at the standby location, transition the vehicle to the manual mode.

At step 807, optionally, the VOM manager 105 may determine a duration of a stopping of a vehicle at a standby location based on an activity of a human operator of a vehicle. In one embodiment, the system 100 may determine/estimate a duration of time required for completing a user activity from beginning to end of the activity. In another scenario, the duration of time may be based on a remaining time to complete the user activity. In various embodiments, the standby location is identified in a map database used by the vehicle, and wherein the standby location is accessible along the road network via one or more roads on which the vehicle can be operated in the automatic mode.

FIGS. 9A through 9E illustrate user interface diagrams for routing and operating mode transition of a vehicle, according to various embodiments.

Figure 9A:
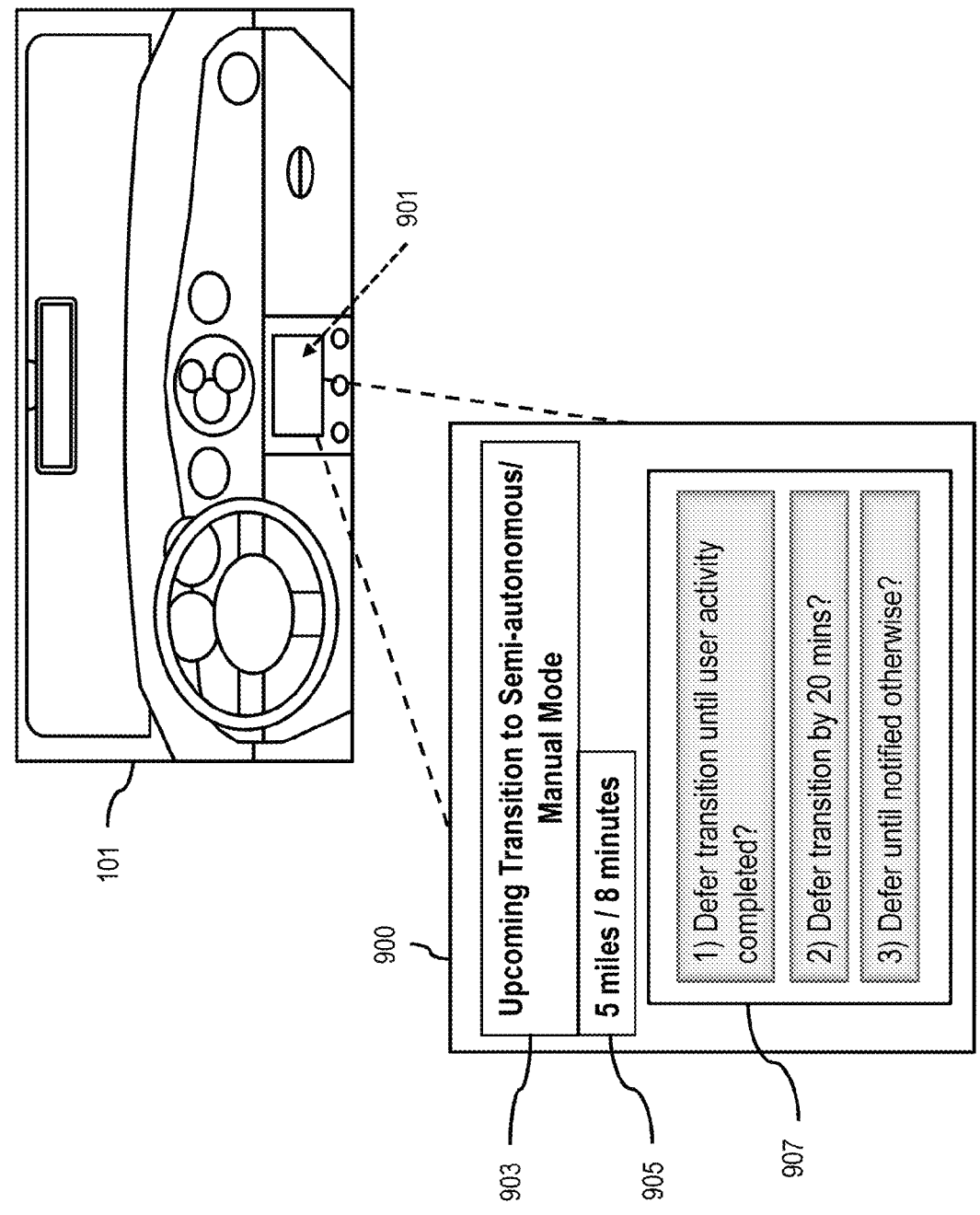
FIGS. 9A through 9E illustrate user interface diagrams for routing and operating mode transition of a vehicle, according to various embodiments.

FIG. 9A illustrates a UI 900 including information and options (a notification) that may be presented to a user, for example, via a device 901 in a vehicle 101 or at a UE 125. The notification includes an indicators 903 and 905 for vehicle operation mode transition information, and options 907 for user selection. The transition information 903 indicates an upcoming transition point where the operating mode of the vehicle has to transition to semi-autonomous or manual mode in an estimated distance of "5 miles or 8 minutes", as indicated by indicator 905. The options 907 may be determined and recommended by the system 100 and/or a service provider 115 and presented to a user of the vehicle for selection. Options 907 include (1) defer transition until user activity completed; (2) defer transition by 20 minutes; and option (3) defer until notified otherwise. As discussed earlier, the options may be determined and recommended based on a variety of factors associated with the user, the user vehicle, a travel route, contextual information associated with the user and the vehicle, or the like information that the system 100 may collect, determine and analyze. Also, a UI may include options for a user to request one or more other actions that may not be presented by the system 100. For example, a user may request for suspension of a user activity (e.g., watching a movie) in the user vehicle at a transition point and a resumption of the activity at a later time.

Figure 9B:
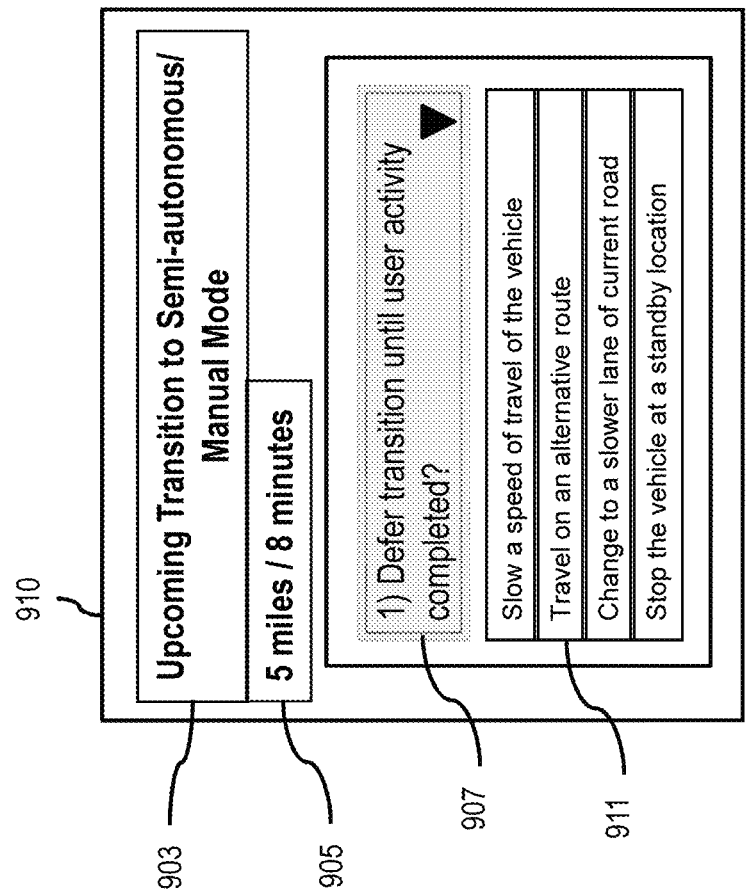

FIG. 9B illustrates a UI 910 indicating a selection of the option (1) to defer transition until user activity completed. In one embodiment, the system 100 may determine one or more options 911 in response to the selected option (1). In one embodiment, the system 100 may determine a duration of the deferral time that may be necessary for the user to complete the user activity and then initiate a one or more of the options 911. For example, if the duration of the deferral time is less than a threshold (e.g., 5-10 mins), then the system 100 may cause one or more of the actions to slow a speed of travel of the vehicle, travel on an alternative route, or change to a slower lane of current road. However, if the duration of the deferral time is more than the threshold (e.g., 5-10 mins), then the system 100 may determine a standby location and reroute the vehicle to stop the vehicle at the standby location for some or all of the remaining duration of the deferral time.

Figure 9C:
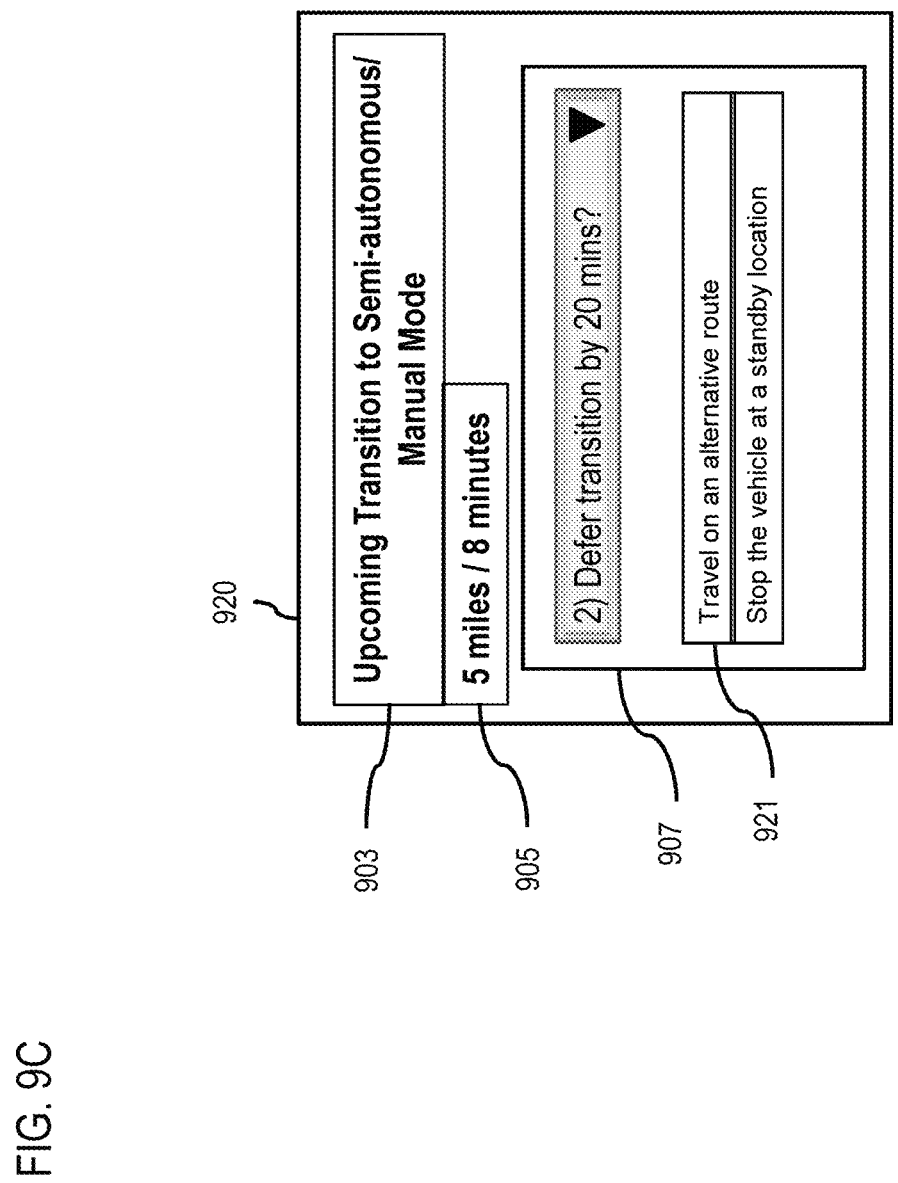

FIG. 9C illustrates a UI 930 indicating a selection of the option (2) to defer transition by 20 minutes. In one embodiment, the system 100 may determine one or more options 921 in response to the selected option (2). In one scenario, if the duration of the deferral time 20 minutes is more than a threshold, then the options 921 may include an option to travel on an alternative route or to reroute the vehicle to stop at a standby location. If stopping at a standby location is the preferred choice, then the system 100 may calculate a rerouting time and a stopping time at the standby location for the total deferral time of 20 minutes. In one scenario, the option to travel on an alternative route in order to meet the 20 minutes deferral time may not be an option in options 921 based on user or system criteria/preference to reduce pollution, reduce cost, avoid adding to traffic congestion, or the like considerations.

Figure 9D:
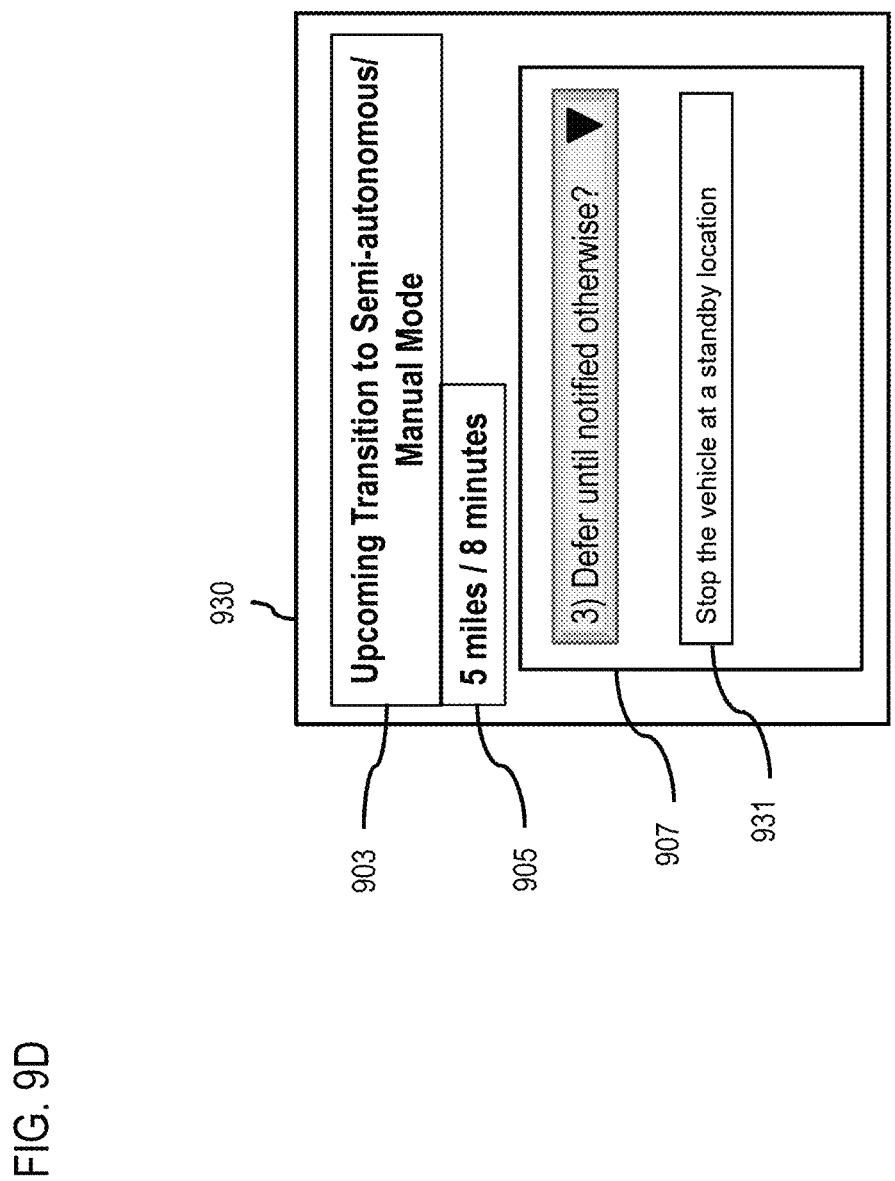

FIG. 9D illustrates a UI 940 indicating a selection of the option (3) to defer until notified otherwise. In one embodiment, the system 100 may determine one or more options 931 in response to the selected option (3). In one embodiment, since the deferral period is not defined, the system 100 may determine the option to stop the vehicle at the standby location until further notice.

Figure 9E:
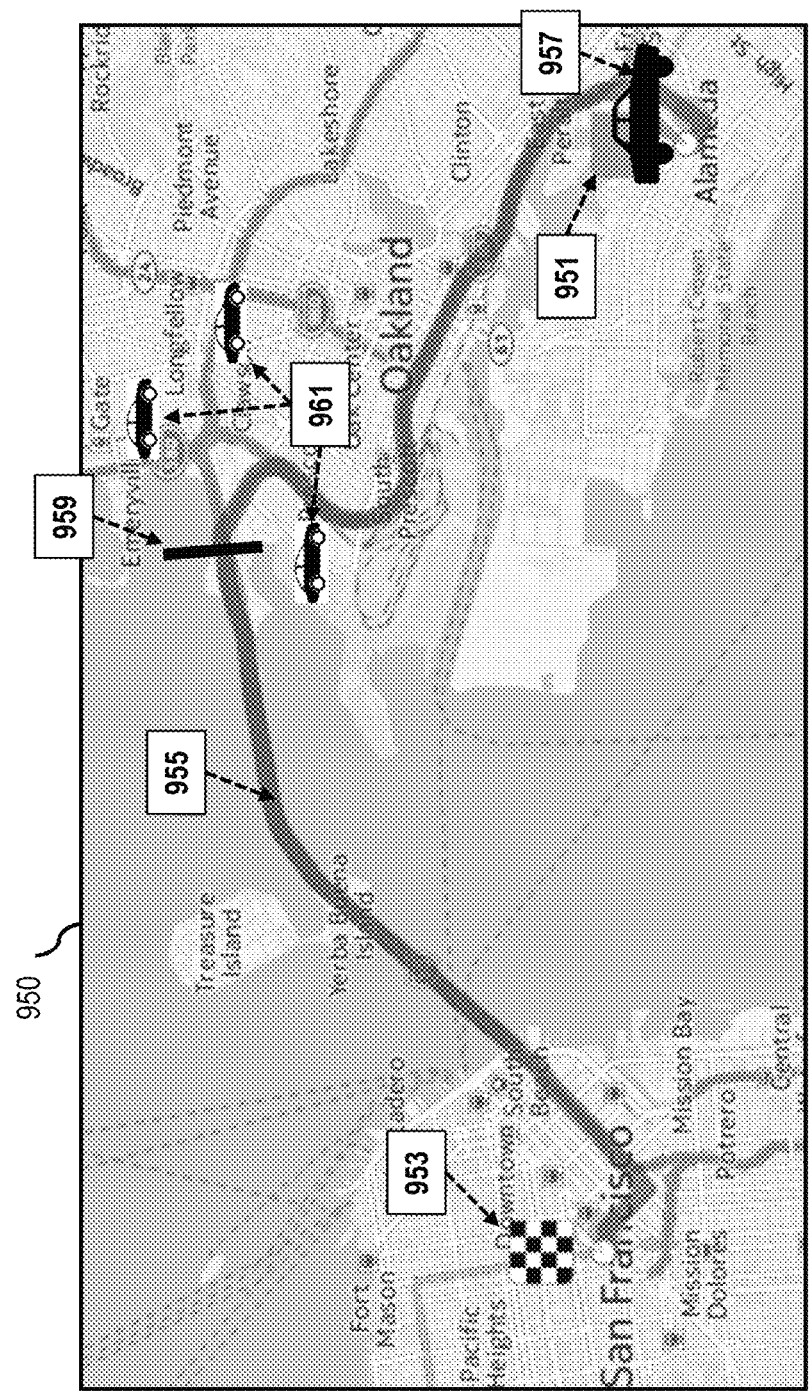

FIG. 9E illustrates a UI 950 that shows a map application including points of origin, 951, and destination, 953, for a travel route 955. In one scenario, a vehicle 957 may begin travel along the travel route in an automatic mode. In various examples, an operator/user of the vehicle 957 may be engaged in a user activity at the beginning of the travel route or may become engaged in a user activity at soon after beginning of the travel. In one scenario, the system 100 may utilize information from various sensors in the vehicle that the user is engaged in an activity. The system 100 may also determine that there is a transition point 959 (e.g., before getting on the bridge) for the operating system of the vehicle 957 to switch to a manual or a semi-autonomous mode. However, the system 100 may determine that the user activity will not be complete before arriving at the transition point 959. In one scenario, the system 100 may identify one or more standby locations 961 (e.g., from one or more map databases) and present them to the user via the UI 950. The system 100 may determine additional information about each standby location 961 and present via one or more UI features. For example, the UI may announce the information about each standby location, may generate pop-up indicators next to each location, the user may tap the UI of a device in the vehicle 957 or on a UE 125. The system 100 may receive one or more selections/commands from the user on a transition decision before reaching the transition point 959.

The processes described herein for determining a transition point/time for an operating mode of a vehicle and initiating a deferral of a transition may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
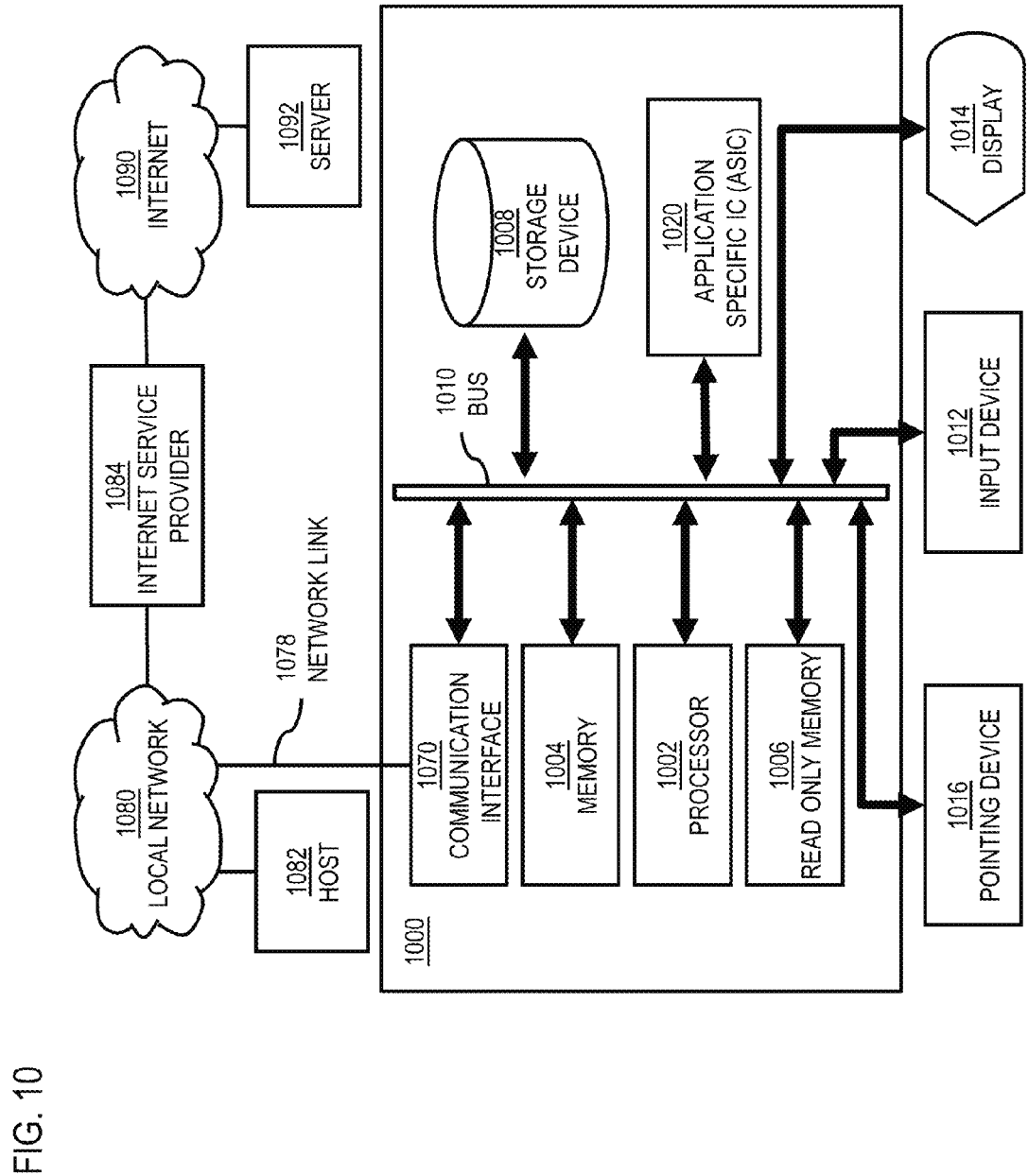
FIG. 10 is a diagram of hardware that can be used to implement an embodiment of the proposed methods.

FIG. 10 illustrates a computer system 1000 upon which an embodiment of the proposed methods may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine a transition point/time for an operating mode of a vehicle and initiate a deferral of a transition as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining a transition point/time for an operating mode of a vehicle and initiating a deferral of a transition.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determining a transition point/time for an operating mode of a vehicle and initiating a deferral of a transition. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for determining a transition point/time for an operating mode of a vehicle and initiating a deferral of a transition. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining a transition point/time for an operating mode of a vehicle and initiating a deferral of a transition, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014, and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 113 for determining a transition point/time for an operating mode of a vehicle and initiating a deferral of a transition.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the proposed methods are related to the use of computer system 1000 for implementing some or all of the techniques described herein. According to one embodiment of the proposed methods, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the proposed methods. Thus, embodiments of the proposed methods are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080, and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the proposed methods may be implemented. Chip set 1100 is programmed to determine a transition point/time for an operating mode of a vehicle and initiate a deferral of a transition as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining a transition point/time for an operating mode of a vehicle and initiating a deferral of a transition.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine a transition point/time for an operating mode of a vehicle and initiate a deferral of a transition. The memory 1105 also stores the data associated with or generated by the execution of the inventive steps.

Figure 12:
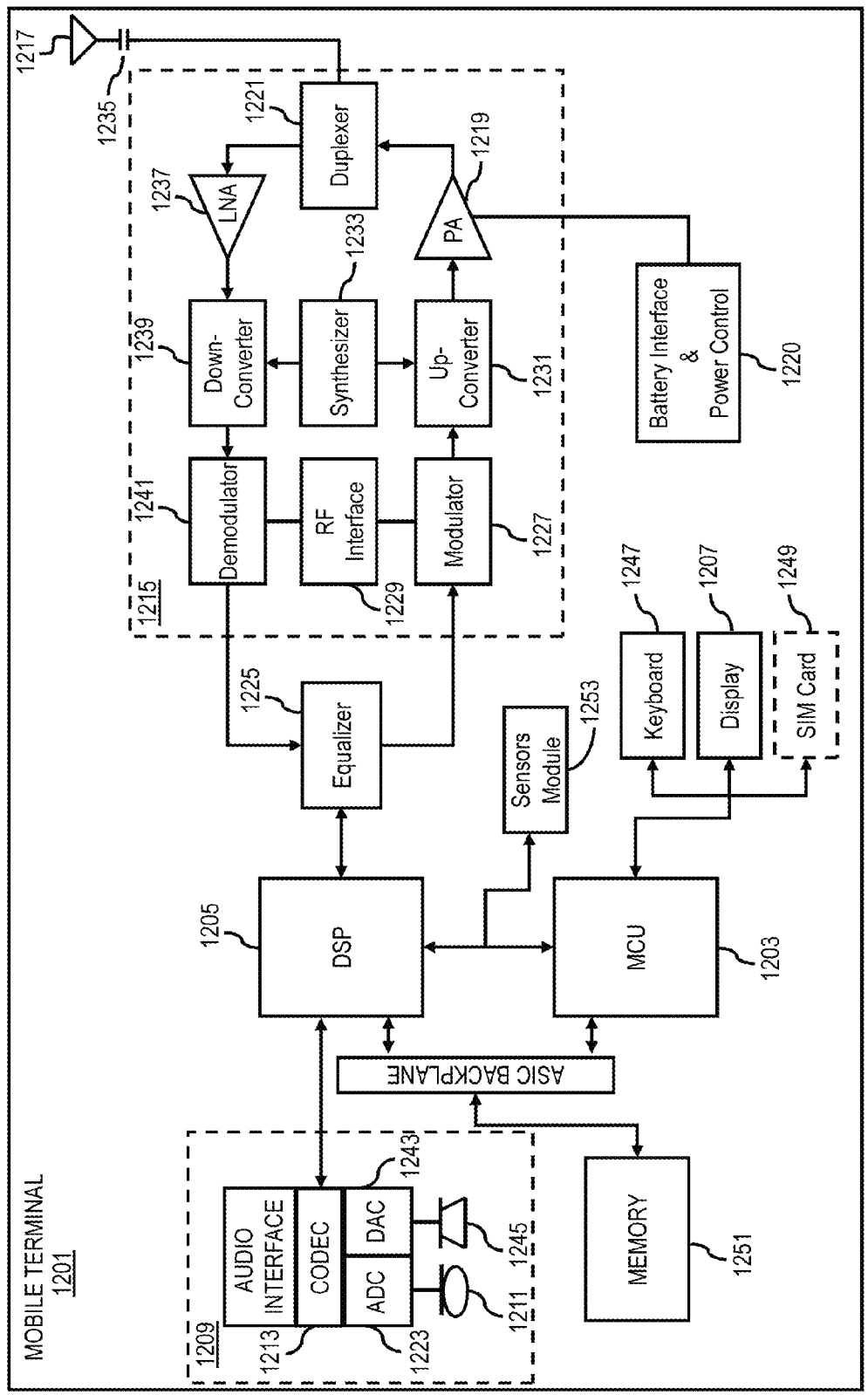
FIG. 12 is a diagram of a mobile device (e.g., a handset) that can be used to implement an embodiment of the proposed methods.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of determining a transition point/time for an operating mode of a vehicle and initiating a deferral of a transition. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining a transition point/time for an operating mode of a vehicle and initiating a deferral of a transition. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 for determining a transition point/time for an operating mode of a vehicle and initiating a deferral of a transition. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Additionally, sensors module 1253 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1201 (e.g., a mobile phone), a user of the mobile terminal 1201, an environment of the mobile terminal 1201 and/or the user, or a combination thereof, wherein the data may be collected, processed, stored, and/or shared with one or more components and/or modules of the mobile terminal 1201 and/or with one or more entities external to the mobile terminal 1201.

While the proposed methods have been described in connection with a number of embodiments and implementations, the proposed methods are not so limited but cover various obvious modifications and equivalent arrangements, which fall within the purview of the appended claims. Although features of the proposed methods are expressed in certain combinations among the claims, it is contemplated that these features can be arranged in any combination and order.

What is claimed is:

1. A method of operation for a land-based passenger-carrying vehicle that travels on a road network, wherein the vehicle has an automatic mode in which one or more systems control travel of the vehicle on the road network and a manual mode in which real-time input from a human operator controls travel on the road network, the method comprising:
   determining, by the one or more systems, that a transition time at which a transition occurs from the automatic mode to the manual mode while the vehicle remains moving, will occur before a complete time of one or more activities of a human operator in the vehicle;
   in response to the determining, initiating, by the one or more systems, a presentation of at least one of options on a user interface to the human operator, wherein the options include slowing down a speed of travel of the vehicle without stopping the vehicle, traveling on an alternative route, and changing to a slower lane of a road upon which the vehicle travels without stopping the vehicle, and each of the options extends a period of time during which the vehicle is operated in the automatic mode beyond an earlier possible time at which the transition could occur; and
   in response to a user selection of one of the options, initiating, by the one or more systems, a modification of an operation of the vehicle to execute the option.

2. The method of claim 1, wherein the alternative route includes a longer route to delay arriving at a transition point for the transition, a different route to avoid the transition point, a road dedicated to autonomous vehicles, or a combination thereof.

3. The method of claim 1, wherein the one or more user activities include content consumption, one or more conference calls, or a combination thereof.

4. The method of claim 1, wherein the automatic mode does not require operator attention for travel on the road network.

5. The method of claim 1, further comprising:
   notifying the human operator about the transition time; and
   providing the modification based on a response from the human operator to the notifying.

6. The method of claim 5, wherein the notifying is provided while the vehicle is in the automatic mode.

7. The method of claim 5, wherein the notifying is provided prior to the vehicle traveling on the road network.

8. The method of claim 1, wherein a deferral of the transition time occurs when the human operator is engaged in an activity requiring attention.

9. The method of claim 1, further comprising:
   determining that the user operator is engaging in the one or more activities when the vehicle is in the automatic mode; and
   estimating the complete time of the one or more activities.

10. An apparatus for operation of a land-based passenger-carrying vehicle that travels on a road network, wherein the vehicle has an automatic mode in which one or more systems control travel of the vehicle on the road network and a manual mode in which real-time input from a human operator controls travel on the road network, the apparatus comprising:
    at least one processor; and
    at least one memory including computer program code for one or more programs,
    the at least one memory and the computer program code configured to, with the at least one processor, cause the apparatus embedded in the one or more systems to:
    determine that a transition time at which a transition occurs from the automatic mode to the manual mode while the vehicle remains moving, will occur before a complete time of one or more activities of a human operator in the vehicle;
    in response to the determining, initiate a presentation of at least one of options on a user interface to the human operator, wherein the options include slowing down a speed of travel of the vehicle without stopping the vehicle, traveling on an alternative route, and changing to a slower lane of a road upon which the vehicle travels without stopping the vehicle, and each of the options extends a period of time during which the vehicle is operated in the automatic mode beyond an earlier possible time at which the transition could occur; and
    in response to a user selection of one of the options, initiate a modification of an operation of the vehicle to execute the option.

11. The apparatus of claim 10, wherein the alternative route includes a longer route to delay arriving at a transition point for the transition, a different route to avoid the transition point, a road dedicated to autonomous vehicles, or a combination thereof.

12. The apparatus of claim 10, wherein the one or more user activities include content consumption, one or more conference calls, or a combination thereof.

13. A non-transitory computer-readable storage medium for operation of a land-based passenger-carrying vehicle that travels on a road network, wherein the vehicle has an automatic mode in which one or more systems control travel of the vehicle on the road network and a manual mode in which real-time input from a human operator controls travel on the road network, the computer-readable storage medium carrying one or more sequences of one or more instructions which, when executed by one or more processors, cause an apparatus embedded in the one or more systems to at least perform the following steps:
    determining that a transition time at which a transition occurs from the automatic mode to the manual mode while the vehicle remains moving, will occur before a complete time of one or more activities of a human operator in the vehicle;
    in response to the determining, initiating a presentation of at least one of options on a user interface to the human operator, wherein the options include slowing down a speed of travel of the vehicle without stopping the vehicle, traveling on an alternative route, and changing to a slower lane of a road upon which the vehicle travels without stopping the vehicle, and each of the options extends a period of time during which the vehicle is operated in the automatic mode beyond an earlier possible time at which the transition could occur; and
    in response to a user selection of one of the options, initiating a modification of an operation of the vehicle to execute the option.

14. The computer-readable storage medium of claim 13, wherein the alternative route includes a longer route to delay arriving at a transition point for the transition, a different route to avoid the transition point, a road dedicated to autonomous vehicles, or a combination thereof.

* * * * *